US012785392B2

(12) United States Patent
Tieng et al.

(10) Patent No.: US 12,785,392 B2
(45) Date of Patent: Nov. 3, 2026

(54) INTELLIGENT ENERGY MANAGEMENT SYSTEM AND METHOD THEREOF

(71) Applicant: NATIONAL CHENG KUNG UNIVERSITY, Tainan City (TW)

(72) Inventors: Hao Tieng, Tainan City (TW); Ting-Chia Ou, Tainan City (TW); Fan-Tien Cheng, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 181 days.

(21) Appl. No.: 18/801,850

(22) Filed: Aug. 13, 2024

(65) Prior Publication Data

US 2025/0192550 A1 Jun. 12, 2025

(30) Foreign Application Priority Data

Dec. 8, 2023 (TW) ................................ 112147851

(51) Int. Cl.
*H02J 3/00* (2026.01)
*H02J 103/30* (2026.01)

(52) U.S. Cl.
CPC .......... *H02J 3/003* (2020.01); *H02J 2103/30* (2026.01)

(58) Field of Classification Search
None
See application file for complete search history.

(56) References Cited

U.S. PATENT DOCUMENTS 8,095,484 B2 1/2012 Cheng et al.
10,618,137 B2 4/2020 Chen et al.
2009/0292386 A1 11/2009 Cheng et al.
2020/0082289 A1* 3/2020 Swierc .................. G06N 20/00
2021/0056430 A1 2/2021 Wu et al.
2023/0013746 A1 1/2023 Lancaster et al.
2023/0376746 A1 11/2023 Woo et al.
2024/0097444 A1* 3/2024 Ou ........................ G06Q 40/04
(Continued)

OTHER PUBLICATIONS

Wu, Haixu, et al., "Autoformer: Decomposition Transformers with Auto-correlation for Long-Term Series Forecasting," Advances in neural information processing systems, vol. 34, 2021.
(Continued)

*Primary Examiner* — Ryan A Jarrett
(74) *Attorney, Agent, or Firm* — CKC & Partners Co., LLC

(57) ABSTRACT

Based on the hybrid architecture of green intelligent manufacturing (GiM), a generic framework for an intelligent energy management system (iEMS) includes the relationships, objective function, and constraints among stage I: production scheduling, stage II: facility control, and stage III: microgrid integration. iEMS uses the cyber-physical agent (CPA) to collect the big data required in the three stages. In particular, the production scheduling results of stage I are inputted to stage II for facility control. Then, the optimal energy baseline generated from the first two stages, are inputted to stage III. At the same time, iEMS interacts with the intelligent carbon-emission management system (iCMS) to consider indirect carbon emission costs and direct carbon emission costs in three stages. iEMS can minimize the power supply cost of microgrid and help GiM accelerate achieving net zero carbon emissions.

20 Claims, 13 Drawing Sheets

(56) References Cited

U.S. PATENT DOCUMENTS

| | | | |
|---|---|---|---|
| 2024/0394522 | A1 | 11/2024 | Ekambaram et al. |
| 2025/0077882 | A1 | 3/2025 | Luzin |

OTHER PUBLICATIONS

Cheng, Fan-Tien, et al., "Industry 4.1 for Wheel Machining Automation," IEEE Robotics and Automation Letters, vol. 1, No. 1, p. 332-339, Jan. 2016.

Chen, Zonglei, et al., "Long sequence time-series forecasting with deep learning: A survey," Information Fusion, vol. 97, Apr. 28, 2023.

* cited by examiner

S282

INTELLIGENT ENERGY MANAGEMENT SYSTEM AND METHOD THEREOF

RELATED APPLICATIONS

This application claims priority to Taiwan Application Serial Number 112147851, filed Dec. 8, 2023, which is herein incorporated by reference.

BACKGROUND

Technical Field

The present disclosure relates to an energy management system and a method thereof. More particularly, the present disclosure relates to an intelligent energy management system and a method thereof which simultaneously integrates production scheduling, facility control, microgrid integration and carbon emission management.

Description of Related Art

The conventional energy management is based on ISO-50001 standard and utilizes power meters to understand past energy consumption of the factory. The energy consumption is managed in accordance with management cycle of "Plan, Do, Check, Action (PDCA)" to improve energy management efficiency and reduce electricity consumption and electricity bills.

There are three key problems with the conventional energy management. First, facility control is not effectively integrated with production scheduling. The current factory equipment is only controlled based on environmental factors, such as month or season, without considering production scheduling. Second, the microgrid is not effectively integrated with factory planning information. The current microgrid is only controlled based on the past energy baseline of power meters of the factory without considering factory planning information (production scheduling and facility control). Third, the energy management system is not effectively integrated with carbon emission information. The production equipment, the factory equipment and the energy generator of the current energy management system only consider indirect carbon emission costs generated by electricity consumption without immediately considering direct emission of greenhouse gases (such as cutting oil from the production equipment, refrigerant escape from air-conditioning equipment or coal from non-renewable energy generator in microgrid, e.g., steam and electricity co-generation).

Therefore, an intelligent energy management system and a method thereof which are capable of simultaneously integrating production scheduling, facility control, microgrid integration and carbon emission management are commercially desirable.

SUMMARY

An object of the present disclosure is to provide an intelligent energy management system (iEMS) and a method thereof. The iEMS and the method thereof are based on the hybrid architecture of green intelligent manufacturing (GiM). A generic framework for iEMS includes the relationships, objective function and constraints among stage I: production scheduling, stage II: facility control and stage III: microgrid integration. In the present disclosure, the production scheduling results of stage I are inputted to stage II for facility control. Then, the optimal energy baseline generated from the first two stages (i.e., stage I and stage II) are inputted to stage III to minimize the power supply cost of microgrid. At the same time, iEMS interacts with the intelligent carbon emission management system (iCMS) to consider indirect carbon emission costs and direct carbon emission costs in three stages to help GiM accelerate achieving net zero carbon emissions, thereby solving the problems that conventional energy management does not define the relationship between electricity consumption in different scenarios and does not consider carbon emission information.

According to one aspect of the present disclosure, an intelligent energy management system includes a memory and a processor. The memory stores a plurality of data sources. The plurality of data sources include production line information, factory information, microgrid information, environmental information, a carbon emission, a low-carbon product process, enterprise organization information and carbon neutrality information. The production line information comes from production equipment of a manufacturing device. The factory information comes from factory equipment of the manufacturing device, and the microgrid information comes from microgrid equipment of the manufacturing device. The processor is signally connected to the memory and configured to perform operations. The operations include performing a plurality of energy prediction operations, a production scheduling operation, a facility control operation and a microgrid integration operation. The plurality of energy prediction operations include calculating the data sources to obtain a plurality of energy prediction information according to an automatic virtual metrology algorithm, and the plurality of energy prediction information include production-equipment predicted energy consumption information, factory-equipment predicted energy consumption information, renewable-energy-generator predicted power generation information and whole-factory optimal predicted total energy consumption information. The production scheduling operation includes calculating the production-equipment predicted energy consumption information, the carbon emission, the low-carbon product process and the enterprise organization information to obtain optimal production scheduling information according to a production scheduling algorithm. The facility control operation includes calculating the optimal production scheduling information, the factory-equipment predicted energy consumption information, the carbon emission and the enterprise organization information to obtain optimal configuration combination information according to a facility control algorithm. The microgrid integration operation includes calculating the whole-factory optimal predicted total energy consumption information, the renewable-energy-generator predicted power generation information and the carbon neutrality information to obtain optimal power distribution ratio information according to a microgrid integration algorithm. The processor manages energy of the manufacturing device according to the optimal production scheduling information, the optimal configuration combination information and the optimal power distribution ratio information.

Therefore, the intelligent energy management system of the present disclosure can achieve cost-minimized scheduling and effectively reduce carbon emissions and energy consumption by simultaneously integrating production scheduling, facility control, microgrid integration and carbon emission management. In addition, using the results of production scheduling and facility control as the constraint of the electricity demand can ensure that the electricity supply can meet the electricity demand to stabilize the balance of the power system while taking into account the reduction of energy consumption and carbon emissions, thereby accelerating the realization of the goals of green smart manufacturing and net-zero carbon emissions.

In some embodiments, the microgrid equipment includes a renewable energy generator. The optimal production scheduling information, the optimal configuration combination information and the optimal power distribution ratio information are configured to control the production equipment, the factory equipment and the renewable energy generator of the microgrid equipment, respectively, to update the production-equipment predicted energy consumption information, the factory-equipment predicted energy consumption information and the renewable-energy-generator predicted power generation information.

In some embodiments, the production scheduling algorithm includes performing a mixed integer linear programming (MILP) to solve the optimal production scheduling information for a minimum production cost. The minimum production cost is calculated as follows:

$$\min PC = w1_{PC}PC^{wait} + w2_{PC}PC^{pro} + w3_{PC}PC^{ele} + (1 - w1_{PC} - w2_{PC} - w3_{PC})PC^{ce};$$

where min PC represents the minimum production cost; $wn_{PC}$ represents a production scheduling weight, and n is one of 1, 2 and 3; $PC^{wait}$ represents a delivery delay cost; $PC^{pro}$ represents a production cost; $PC^{ele}$ represents an electricity cost; and $PC^{ce}$ represents a carbon emission cost.

In some embodiments, the delivery delay cost is calculated as follows:

$$PC^{wait} = \sum_{j=1}^{J} \max(\max(F_{mj}) - D_j, 0)C_{wait,j};$$

$$B_{mj} \geq F_{mj'} + T_{mjj'} - (1 - S_{mjj'}) \cdot L; \text{ and}$$

$$F_{mj} \geq B_{mj} + P_{mj} - (1 - O_{mj}) \cdot L;$$

where $F_{mj}$ represents a completion time of job j on machine m; $D_j$ represents a due date of the job j; $C_{wait,j}$ represents a delay cost of the job j; J represents a number of the job j; $B_{mj}$ represents a starting time of the job j on the machine m; $F_{mj'}$ represents a completion time of job j' on the machine m; $T_{mjj'}$ represents a setup time from the job j' to the job j on the machine m; $S_{mjj'}$ represents a sequence status of the job j and the job j' on the machine m, $S_{mjj'}$=1 if the job j' precedes the job j on the machine m, and $S_{mjj'}$=0 otherwise; L represents a large-value punishment constant; and $P_{mj}$ represents a processing time of the job j on the machine m.

In some embodiments, the production cost is calculated as follows:

$$PC^{pro} = \sum_{m=1}^{M} \sum_{j=1}^{J}, O_{mj} \cdot C_{pro,mj}; \text{ and}$$

$$\sum_{m=1}^{M} O_{mj} = 1, \forall j;$$

where M represents a number of machine m; $O_{mj}$ represents an execution status of job j on the machine m, $O_{mj}$=1 if the job j is processed on the machine m, and $O_{mj}$=0 otherwise; and $C_{pro,mj}$ represents a production cost of the job j on the machine m. The electricity cost is calculated as follows:

$$PC^{ele} = \sum_{m=1}^{M} \sum_{j=1}^{J} \sum_{i=B_{mj}}^{F_{mj}} O_{mj} \cdot (EP_{pro})_{j,m,i} \cdot P_i^E;$$

where $(EP_{pro})_{j,m,i}$ represents a power consumption of the job j executed on the machine m during period i; and $$P_i^E$$

represents a time-of-use electricity price for the period i; and the carbon emission cost is calculated as follows:

$$PC^{ce} = \sum_{m=1}^{M} \sum_{j=1}^{J} \sum_{i=B_{mj}}^{F_{mj}} \left(CD_{mj} + (EP_{pro})_{j,m,i} \cdot CEC_{ele}\right) \cdot O_{mj} P_i^C;$$

where $CD_{mj}$ represents a direct carbon emission of the job j executed on the machine m, which is obtained by a carbon disclosure; $CEC_{ele}$ represents an electricity carbon emission coefficient; and $$P_i^C$$

represents a time-of-use carbon price for the period i.

In some embodiments, the facility control algorithm includes performing an optimization algorithm to solve the optimal configuration combination information for a minimum factory cost. The minimum factory cost is calculated as follows:

$$\min FC = w_{FC}FC^{ele} + (1 - w_{FC})FC^{ce};$$

where min FC represents the minimum factory cost; $w_{FC}$ represents a facility control weight; $FC^{ele}$ represents an electricity cost; and $FC^{ce}$ represents a carbon emission cost.

In some embodiments, the factory equipment has a load and a facility load demand, and the load and the facility load demand are calculated as follows:

$$0 \leq \sum_{f=1}^{F} \text{Load}_f \leq \sum_{f=1}^{F} \text{Rated Load}_f; \text{ and}$$

$$FLD \leq \sum_{f=1}^{F} \sum_{i=1}^{R} \text{Load}_{f,i};$$

where F represents a number of the factory equipment f; R represents a number of period i; $\text{Load}_f$ represents the load of the factory equipment f, Rated $\text{Load}_f$ represents a rated load of the factory equipment f; FLD represents the facility load demand; and $\text{Load}_{f,i}$ represents a cumulative load provided from the factory equipment f during the period i.

In some embodiments, the electricity cost of the factory equipment is calculated as follows:

$$FC^{ele} = \sum_{f=1}^{F} \sum_{i=1}^{R} (EP_{fac})_{f,i} \cdot P_i^E; \text{ and}$$

$$\sum_{f=1}^{F} \sum_{\tau=1}^{T} (EP_{fac})_{f,\tau} = \sum_{f=1}^{F} \sum_{i=1}^{R} EP_{fac}(IFP_{fac})_{f,i};$$

where F represents a number of the factory equipment f; T represents a number of period t; R represents a number of period i;

$$i; P_i^E$$

represents a time-of-use electricity price for the period i; $(EP_{fac})_{f,i}$ represents a predicted power consumption of the factory equipment f during the period i; $(EP_{fac})_{f,\tau}$ represents a predicted power consumption of the factory equipment f during the period τ; $IFP_{fac}$ represents a facility parameter; and $EP_{fac}$ represents a factory-equipment energy prediction model. The carbon emission cost of the factory equipment is calculated as follows:

$$FC^{ce} = \sum_{f=1}^{F} \sum_{i=1}^{R} \left(CD_f + (EP_{fac})_{f,i} \cdot CEC_{ele}\right) \cdot P_i^C;$$

where $CD_f$ represents another carbon emission from a fugitive emission source, which is obtained by a carbon disclosure; $CEC_{ele}$ represents an electricity carbon emission coefficient; and $$P_i^C$$

represents a time-of-use carbon price for the period i.

In some embodiments, the microgrid integration algorithm includes performing an optimization algorithm to solve the optimal power distribution ratio information for a minimum microgrid cost. The minimum microgrid cost is calculated as follows:

$$\min MC = w1_{MC}MC^C + w2_{MC}MC^O + w3_{MC}MC^{UG} + w4_{MC}MC^F + (1 - w1_{MC} - w2_{MC} - w3_{MC} - w4_{MC})MC^E;$$

where min MC represents the minimum microgrid cost; $wn_{MC}$ represents a power distribution weight, and n is one of 1, 2, 3 and 4; $MC^C$ represents a carbon emission cost; $MC^O$ represents an equipment operation cost; $MC^{UG}$ represents an electricity cost; $MC^F$ represents a fuel cost; and $MC^E$ represents a charge-discharge efficiency cost. The whole-factory optimal predicted total energy consumption information is calculated as follows:

$$(\widehat{EC}_{all}(T_{k+1}) = \widehat{EC}_{pro}(T_{k+1}) + \widehat{EC}_{fac}(T_{k+1});$$

where $\widehat{EC}_{all}(T_{k+1})$ represents the whole-factory optimal predicted total energy consumption information; $\widehat{EC}_{pro}(T_{k+1})$ represents an estimated energy consumption corresponding to the optimal production scheduling information of the production equipment; and $\widehat{EC}_{fac}(T_{k+1})$ represents another estimated energy consumption corresponding to the optimal configuration combination information of the factory equipment.

In some embodiments, the processor is configured to perform the operations further includes performing a carbon disclosure operation, a carbon reduction operation and a carbon neutrality operation. The carbon disclosure operation includes obtaining an inventory data by performing carbon inventory on the manufacturing device, and then providing the inventory data to a plurality of cyber physical agents, and generating product raw material information corresponding to a product, and the inventory data includes the carbon emission. The carbon reduction operation includes improving the low-carbon product process of the product based on the product raw material information so as to reduce the carbon emission. The carbon neutrality operation includes realizing a net zero principle according to a low-carbon energy allocation method when the carbon emission no longer be reduced through the low-carbon product process at a present stage, and the low-carbon energy allocation method includes a carbon credit or a carbon offset.

According to another aspect of the present disclosure, an intelligent energy management method includes performing an information obtaining step and an intelligent energy management step. The information obtaining step includes configuring a memory to obtain a plurality of data sources. The plurality of data sources include production line information, factory information, microgrid information, environmental information, a carbon emission, a low-carbon product process, enterprise organization information and carbon neutrality information. The production line information comes from production equipment of a manufacturing device. The factory information comes from factory equipment of the manufacturing device, and the microgrid information comes from microgrid equipment of the manufacturing device. The intelligent energy management step includes performing a plurality of energy prediction steps, a production scheduling step, a facility control step and a microgrid integration step. The plurality of energy prediction steps include configuring a processor to calculate the data sources to obtain a plurality of energy prediction information according to an automatic virtual metrology algorithm, and the plurality of energy prediction information include production-equipment predicted energy consumption information, factory-equipment predicted energy consumption information, renewable-energy-generator predicted power generation information and whole-factory optimal predicted total energy consumption information. The production scheduling step includes configuring the processor to calculate the production-equipment predicted energy consumption information, the carbon emission, the low-carbon product process and the enterprise organization information to obtain optimal production scheduling information according to a production scheduling algorithm. The facility control step includes configuring the processor to calculate the optimal production scheduling information, the factory-equipment predicted energy consumption information, the carbon emission and the enterprise organization information to obtain optimal configuration combination information according to a facility control algorithm. The microgrid integration step includes configuring the processor to calculate the whole-factory optimal predicted total energy consumption information, the renewable-energy-generator predicted power generation information and the carbon neutrality information to obtain optimal power distribution ratio information according to a microgrid integration algorithm. The processor manages energy of the manufacturing device according to the optimal production scheduling information, the optimal configuration combination information and the optimal power distribution ratio information.

Therefore, the intelligent energy management method of the present disclosure can achieve cost-minimized scheduling and effectively reduce carbon emissions and energy consumption by simultaneously integrating production scheduling, facility control, microgrid integration and carbon emission management. In addition, using the results of production scheduling and facility control as the constraint of the electricity demand can ensure that the electricity supply can meet the electricity demand to stabilize the balance of the power system while taking into account the reduction of energy consumption and carbon emissions, thereby accelerating the realization of the goals of green smart manufacturing and net-zero carbon emissions.

In some embodiments, the microgrid equipment includes a renewable energy generator. The optimal production scheduling information, the optimal configuration combination information and the optimal power distribution ratio information are configured to control the production equipment, the factory equipment and the renewable energy generator of the microgrid equipment, respectively, to update the production-equipment predicted energy consumption information, the factory-equipment predicted energy consumption information and the renewable-energy-generator predicted power generation information.

In some embodiments, the production scheduling algorithm includes performing a mixed integer linear programming (MILP) to solve the optimal production scheduling information for a minimum production cost. The minimum production cost is calculated as follows:

$$\min PC = w1_{PC}PC^{wait} + w2_{PC}PC^{pro} + w3_{PC}PC^{ele} + (1 - w1_{PC} - w2_{PC} - w3_{PC})PC^{ce};$$

where min PC represents the minimum production cost; $wn_{PC}$ represents a production scheduling weight, and n is one of 1, 2 and 3; $PC^{wait}$ represents a delivery delay cost; $PC^{pro}$ represents a production cost; $PC^{ele}$ represents an electricity cost; and $PC^{ce}$ represents a carbon emission cost.

In some embodiments, the delivery delay cost is calculated as follows:

$$PC^{wait} = \sum_{j=1}^{J} \max(\max(F_{mj}) - D_j, 0)C_{wait,j};$$

$$B_{mj} \geq F_{mj'} + T_{mjj'} - (1 - S_{mjj'}) \cdot L; \text{ and}$$

$$F_{mj} \geq B_{mj} + P_{mj} - (1 - O_{mj}) \cdot L;$$

where $F_{mj}$ represents a completion time of job j on machine m; $D_j$ represents a due date of the job j; $C_{wait,j}$ represents a delay cost of the job j; J represents a number of the job j; $B_{mj}$ represents a starting time of the job j on the machine m; $F_{mj'}$ represents a completion time of job j' on the machine m; $T_{mjj'}$ represents a setup time from the job j' to the job j on the machine m; $S_{mij'}$ represents a sequence status of the job j and the job j' on the machine m, $S_{mjj'}=1$ if the job j' precedes the job j on the machine m, and $S_{mij}=0$ otherwise; L represents a large-value punishment constant; and $P_{mj}$ represents a processing time of the job j on the machine m.

In some embodiments, the production cost is calculated as follows:

$$PC^{pro} = \sum_{m=1}^{M} \sum_{j=1}^{J}, O_{mj} \cdot C_{pro,mj}; \text{ and}$$

-continued $$\sum_{m=1}^{M} O_{mj} = 1, \forall j;$$

where M represents a number of machine m; $O_{mj}$ represents an execution status of job j on the machine m, $O_{mj}=1$ if the job j is processed on the machine m, and $O_{mj}=0$ otherwise; and $C_{pro,mj}$ represents a production cost of the job j on the machine m. The electricity cost is calculated as follows:

$$PC^{ele} = \sum_{m=1}^{M} \sum_{j=1}^{J} \sum_{i=B_{mj}}^{F_{mj}} O_{mj} \cdot (EP_{pro})_{j,m,i} \cdot P_i^E;$$

where $(EP_{pro})_{j,m,i}$ represents a power consumption of the job j executed on the machine m during period i; and $$P_i^E$$

represents a time-of-use electricity price for the period i; and the carbon emission cost is calculated as follows:

$$PC^{ce} = \sum_{m=1}^{M} \sum_{j=1}^{J} \sum_{i=B_{mj}}^{F_{mj}} (CD_{mj} + (EP_{pro})_{j,m,i} \cdot CEC_{ele}) \cdot O_{mj} P_i^c;$$

where $CD_{mj}$ represents a direct carbon emission of the job j executed on the machine m, which is obtained by a carbon disclosure; $CEC_{ele}$ represents an electricity carbon emission coefficient; and $$P_i^C$$

represents a time-of-use carbon price for the period i.

In some embodiments, the facility control algorithm includes performing an optimization algorithm to solve the optimal configuration combination information for a minimum factory cost. The minimum factory cost is calculated as follows:

$$\min FC = w_{FC}FC^{ele} + (1 - w_{FC})FC^{ce};$$

where min FC represents the minimum factory cost; $w_{FC}$ represents a facility control weight; $FC^{ele}$ represents an electricity cost; and $FC^{ce}$ represents a carbon emission cost.

In some embodiments, the factory equipment has a load and a facility load demand, and the load and the facility load demand are calculated as follows:

$$0 \leq \sum_{f=1}^{F} \text{Load}_f \leq \sum_{f=1}^{F} \text{Rated Load}_f; \text{ and}$$

$$FLD \leq \sum_{f=1}^{F} \sum_{i=1}^{R} \text{Load}_{f,i};$$

where F represents a number of the factory equipment f, R represents a number of period i; $\text{Load}_f$ represents the load of the factory equipment f; Rated $\text{Load}_f$ represents a rated load of the factory equipment f, FLD represents the facility load demand; and $\text{Load}_{f,i}$ represents a cumulative load provided from the factory equipment f during the period i.

In some embodiments, the electricity cost of the factory equipment is calculated as follows:

$$FC^{ele}=\sum_{f=1}^{F}\sum_{i=1}^{R}(EP_{fac})_{f,i}\cdot P_i^E,\text{ and}$$

$$\sum_{f=1}^{F}\sum_{\tau=1}^{T}(EP_{fac})_{f,\tau}=\sum_{f=1}^{F}\sum_{i=1}^{R}EP_{fac}(IFP_{fac})_{f,i};$$

where F represents a number of the factory equipment f; T represents a number of period t; R represents a number of period i;

i; $P_i^E$ represents a time-of-use electricity price for the period i; $(EP_{fac})_{f,i}$ represents a predicted power consumption of the factory equipment f during the period i; $(EP_{fac})_{f,\tau}$ represents a predicted power consumption of the factory equipment f during the period $\tau$; $IFP_{fac}$ represents a facility parameter; and $EP_{fac}$ represents a factory-equipment energy prediction model. The carbon emission cost of the factory equipment is calculated as follows:

$$FC^{ce}=\sum_{f=1}^{F}\sum_{i=1}^{R}\left(CD_f+(EP_{fac})_{f,i}\cdot CEC_{ele}\right)\cdot P_i^c;$$

where $CD_f$ represents another carbon emission from a fugitive emission source, which is obtained by a carbon disclosure; $CEC_{ele}$ represents an electricity carbon emission coefficient; and $P_i^C$ represents a time-of-use carbon price for the period i.

In some embodiments, the microgrid integration algorithm includes performing an optimization algorithm to solve the optimal power distribution ratio information for a minimum microgrid cost. The minimum microgrid cost is calculated as follows:

$$\min MC=w1_{MC}MC^C+w2_{MC}MC^O+w3_{MC}MC^{UG}+w4_{MC}MC^F+(1-w1_{MC}-w2_{MC}-w3_{MC}-w4_{MC})MC^E;$$

where min MC represents the minimum microgrid cost; $wn_{MC}$ represents a power distribution weight, and n is one of 1, 2, 3 and 4; $MC^C$ represents a carbon emission cost; $MC^O$ represents an equipment operation cost; $MC^{UG}$ represents an electricity cost; $MC^F$ represents a fuel cost; and $MC^E$ represents a charge-discharge efficiency cost. The whole-factory optimal predicted total energy consumption information is calculated as follows:

$$\widehat{EC}_{all}(T_{k+1})=\widehat{EC}_{pro}(T_{k+1})+\widehat{EC}_{fac}(T_{k+1});$$

where $\widehat{EC}_{all}(T_{k+1})$ represents the whole-factory optimal predicted total energy consumption information; $\widehat{EC}_{pro}(T_{k+1})$ represents an estimated energy consumption corresponding to the optimal production scheduling information of the production equipment; and $\widehat{EC}_{fac}(T_{k+1})$ represents another estimated energy consumption corresponding to the optimal configuration combination information of the factory equipment.

In some embodiments, the processor is configured to perform the operations further includes performing a carbon disclosure operation, a carbon reduction operation and a carbon neutrality operation. The carbon disclosure operation includes obtaining an inventory data by performing carbon inventory on the manufacturing device, and then providing the inventory data to a plurality of cyber physical agents, and generating product raw material information corresponding to a product, and the inventory data includes the carbon emission. The carbon reduction operation includes improving the low-carbon product process of the product based on the product raw material information so as to reduce the carbon emission. The carbon neutrality operation includes realizing a net zero principle according to a low-carbon energy allocation method when the carbon emission no longer be reduced through the low-carbon product process at a present stage, and the low-carbon energy allocation method includes a carbon credit or a carbon offset.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details are unnecessary. In addition, for simplifying the drawings, some conventional structures and elements will be simply illustrated, and repeated elements may be represented by the same labels.

It will be understood that when an element (or device, module) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Based on the hybrid architecture of green intelligent manufacturing (GiM), the present disclosure proposes a generic framework for intelligent energy management system (iEMS), including the relationships, objective function and constraints among stage I: production scheduling, stage II: facility control and stage III: microgrid integration. iEMS uses the cyber-physical agent (CPA) to collect the big data required in the three stages. In particular, the production scheduling results of stage I are inputted to stage II for facility control. Then, the optimal energy baseline generated from the first two stages (i.e., stage I and stage II) are inputted to stage III to minimize the power supply cost of microgrid. At the same time, iEMS interacts with the intelligent carbon emission management system (iCMS) to consider indirect carbon emission costs (such as electricity consumption) and direct carbon emission costs (such as raw materials for production, refrigerant escape from air-conditioning equipment or fuel used in microgrid) in three stages to help GiM accelerate achieving net zero carbon emissions.

Figure 1:
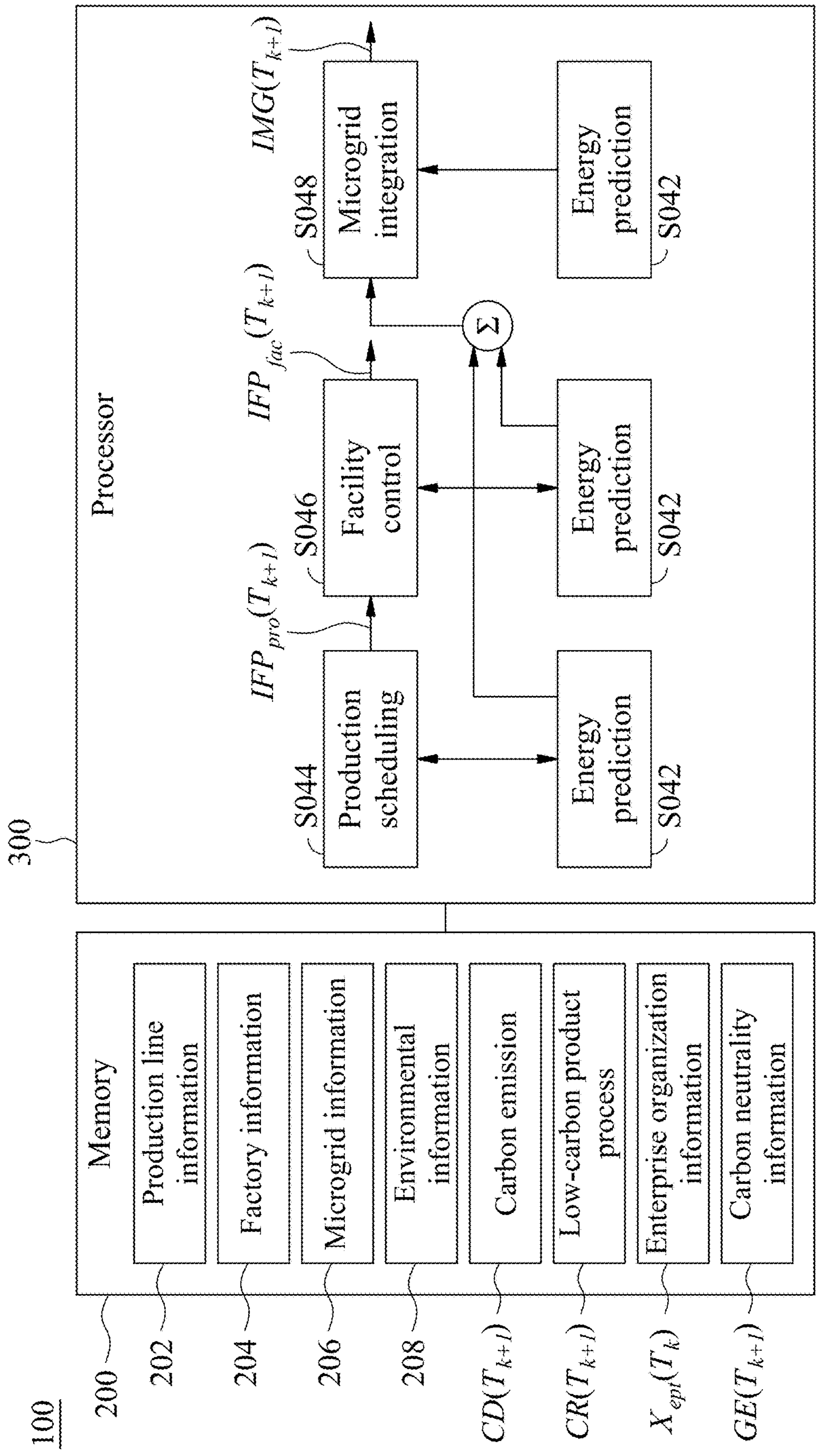
FIG. 1 shows a schematic view of an intelligent energy management system according to a first embodiment of the present disclosure.
Figure 2:
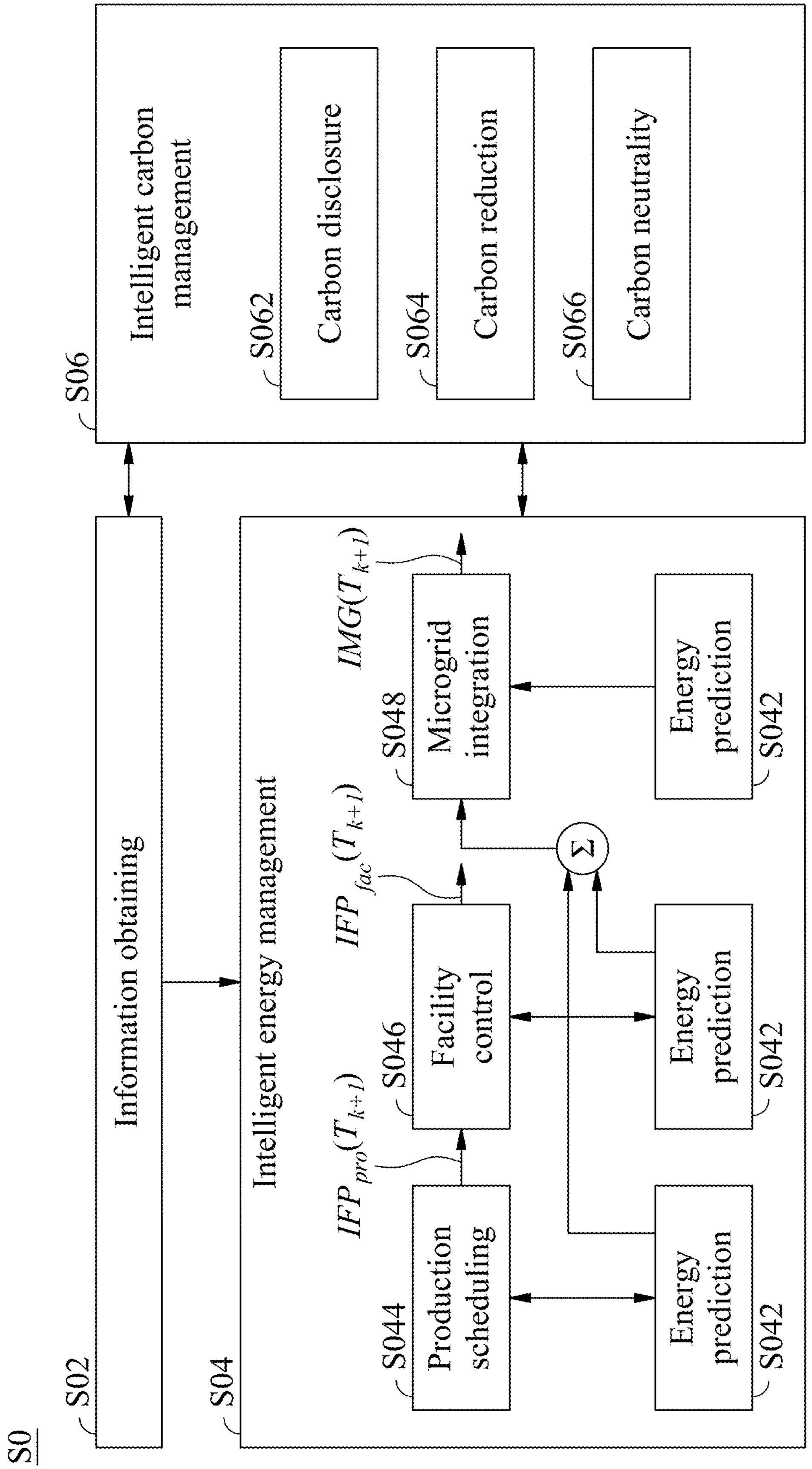
FIG. 2 shows a flow chart of an intelligent energy management method according to a second embodiment of the present disclosure.
Figure 3:
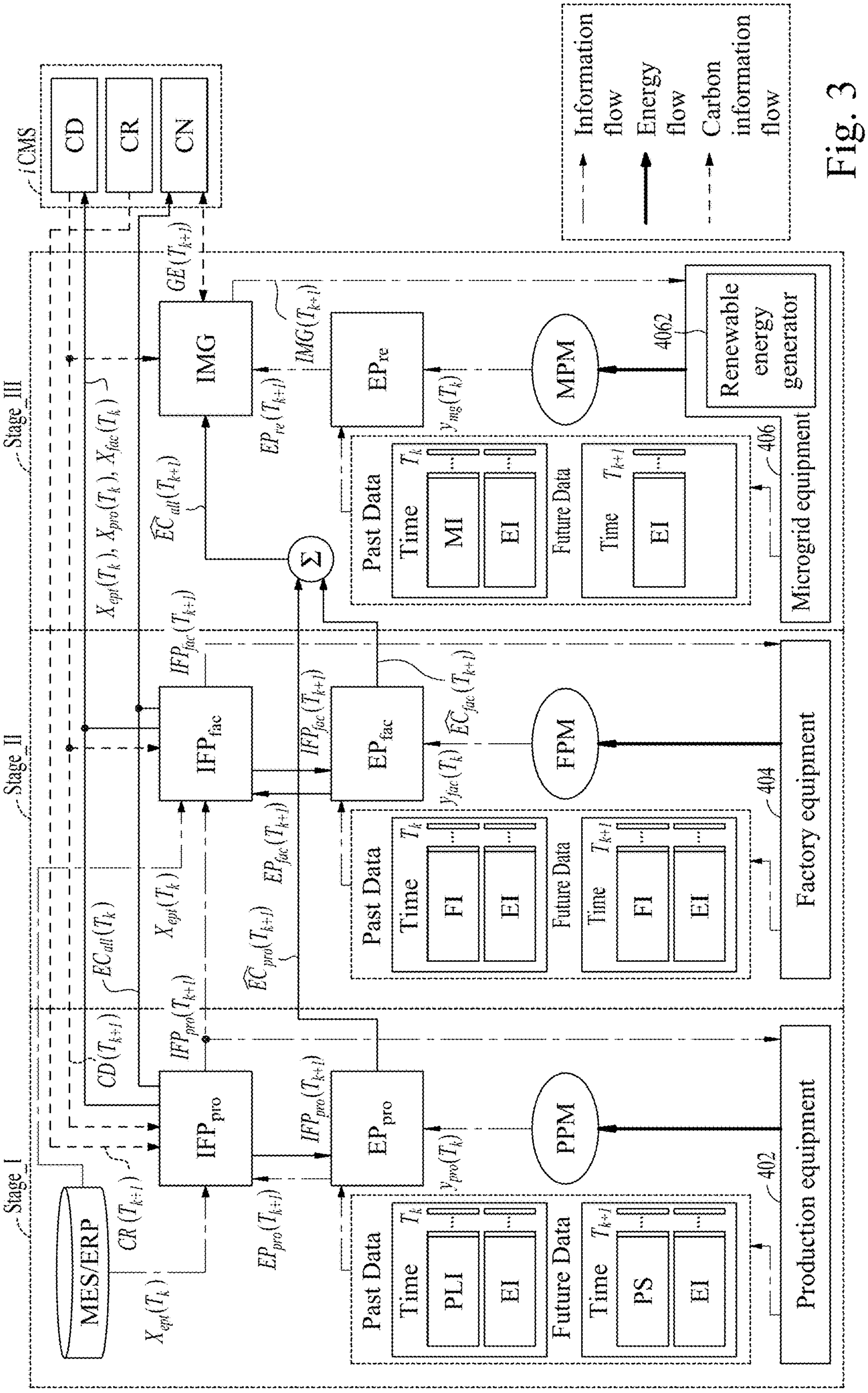
FIG. 3 shows a schematic view of three stages and an intelligent carbon emission management system of an intelligent energy management system according to a third embodiment of the present disclosure.

Referring to FIGS. 1, 2 and 3. FIG. 1 shows a schematic view of an intelligent energy management system 100 according to a first embodiment of the present disclosure. FIG. 2 shows a flow chart of an intelligent energy management method S0 according to a second embodiment of the present disclosure. FIG. 3 shows a schematic view of three stages and an intelligent carbon emission management system iCMS of an intelligent energy management system (iEMS) according to a third embodiment of the present disclosure. The intelligent energy management system 100 includes a memory 200 and a processor 300. The memory 200 stores a plurality of data sources. The plurality of data sources include production line information 202 (PLI), factory information 204 (FI), microgrid information 206 (MI), environmental information 208 (EI), a carbon emission $CD(T_{k+1})$, a low-carbon product process $CR(T_{k+1})$, enterprise organization information $X_{ept}(T_k)$ and carbon neutrality information $GE(T_{k+1})$. The production line information 202 comes from production equipment 402 of a manufacturing device. The factory information 204 comes from factory equipment 404 of the manufacturing device, and the microgrid information 206 comes from microgrid equipment 406 of the manufacturing device. The environmental information 208 includes indoor environmental factor information, carbon inventory boundary information, gas inventory information and outdoor environmental factor information. The carbon emission $CD(T_{k+1})$, the low-carbon product process $CR(T_{k+1})$ and the carbon neutrality information $GE(T_{k+1})$ comes from the intelligent carbon emission management system iCMS. The enterprise organization information $X_{ept}(T_k)$ includes manufacturing execution system (MES) information, enterprise resource planning (ERP) information and factory basic demand information.

The processor 300 is signally connected to the memory 200 and configured to perform the intelligent energy management method S0. The processor 300 includes the intelligent services of Industry 4.1, so that the original various types of prediction results can be obtained before the process of Industry 4.2 is achieved; the intelligent services of Industry 4.1 include automatic virtual metrology (AVM), intelligent predictive maintenance (IPM), intelligent yield management (IYM) and intelligent dispatching system (IDS). The processor 300 also includes green intelligent manufacturing, intelligent carbon management and intelligent energy management of GiM.

The memory 200 may include random access memory (RAM) or other types of dynamic storage devices that can store information and instructions for the processor 300 to perform. The information and instructions include greenhouse gas emission factors, activity data, product carbon emission, streaming information management, blockchain and file system. The memory 200 can be regarded as a database. The processor 300 may include any type of processors (e.g., a cloud processor), microprocessors, or field programmable gate arrays (FPGA) capable of compiling and performing instructions. The processor 300 may include a single device (e.g., single-core processor) or a group of devices (e.g., multiple-core processor), but the present disclosure is not limited thereto.

The intelligent energy management method S0 includes performing an information obtaining step S02 and an intelligent energy management step S04. The information obtaining step S02 includes configuring the memory 200 to obtain the plurality of data sources. The plurality of data sources include the production line information 202, the factory information 204, the microgrid information 206, the environmental information 208, the carbon emission $CD(T_{k+1})$, the low-carbon product process $CR(T_{k+1})$, the enterprise organization information $X_{ept}(T_k)$ and the carbon neutrality information $GE(T_{k+1})$. The intelligent energy management step S04 includes performing a plurality of energy prediction steps S042, a production scheduling step S044, a facility control step S046 and a microgrid integration step S048. The plurality of energy prediction steps S042 include configuring the processor 300 to calculate the data sources to obtain a plurality of energy prediction information according to an automatic virtual metrology algorithm, and the plurality of energy prediction information include production-equipment predicted energy consumption information $EP_{pro}(T_{k+1})$, factory-equipment predicted energy consumption information $EP_{fac}(T_{k+1})$, renewable-energy-generator predicted power generation information $EP_{re}(T_{k+1})$ and whole-factory optimal predicted total energy consumption information $\widehat{EC}_{all}(T_{k+1})$. The production scheduling step S044 includes configuring the processor 300 to calculate the production-equipment predicted energy consumption information $EP_{pro}(T_{k+1})$, the carbon emission $CD(T_{k+1})$, the low-carbon product process $CR(T_{k+1})$ and the enterprise organization information $X_{ept}(T_k)$ to obtain optimal production scheduling information $IFP_{pro}(T_{k+1})$ according to a production scheduling algorithm. In addition, the facility control step S046 includes configuring the processor 300 to calculate the optimal production scheduling information $IFP_{pro}(T_{k+1})$, the factory-equipment predicted energy consumption information $EP_{fac}(T_{k+1})$, the carbon emission $CD(T_{k+1})$ and the enterprise organization information $X_{ept}(T_k)$ to obtain optimal configuration combination information $IFP_{fac}(T_{k+1})$ according to a facility control algorithm. The microgrid integration step S048 includes configuring the processor 300 to calculate the whole-factory optimal predicted total energy consumption information $\widehat{EC}_{all}(T_{k+1})$, the renewable-energy-generator predicted power generation information $EP_{re}(T_{k+1})$ and the carbon neutrality information $GE(T_{k+1})$ to obtain optimal power distribution ratio information $IMG(T_{k+1})$ according to a microgrid integration algorithm. The processor 300 manages energy of the manufacturing device according to the optimal production scheduling information $IFP_{pro}(T_{k+1})$, the optimal configuration combination information $IFP_{fac}(T_{k+1})$ and the optimal power distribution ratio information $IMG(T_{k+1})$.

In the third embodiment of FIG. 3, the intelligent energy management system (iEMS) includes three stages. The three stages are production scheduling Stage_I, facility control Stage_II and microgrid integration Stage_III. iEMS acquires input data of each of the three stages from CPA and solve minimum cost by IDS and a genetic algorithm so as to output optimal schedule. Furthermore, the microgrid equipment 406 includes a renewable energy generator 4062. The optimal production scheduling information $IFP_{pro}(T_{k+1})$, the optimal configuration combination information $IFP_{fac}(T_{k+1})$ and the optimal power distribution ratio information $IMG(T_{k+1})$ are configured to control the production equipment 402, the factory equipment 404 and the renewable energy generator 4062 of the microgrid equipment 406, respectively, to update the production-equipment predicted energy consumption information $EP_{pro}(T_{k+1})$, the factory-equipment predicted energy consumption information $EP_{fac}(T_{k+1})$ and the renewable-energy-generator predicted power generation information $EP_{re}(T_{k+1})$.

In the first stage (production scheduling Stage_I), past production line information $(T_k)$, past environmental information $(T_k)$, future production schedule $(T_{k+1})$, future environmental information $(T_{k+1})$ and production power meter data $y_{pro}(T_k)$ are used as inputs of a production energy consumption prediction module $EP_{pro}$ (the energy prediction step S042) to generate the production-equipment predicted energy consumption information $EP_{pro}(T_{k+1})$. The production-equipment predicted energy consumption information $EP_{pro}(T_{k+1})$ is used as a scheduling reference of intelligent factory production scheduling $IFP_{pro}$ (the production scheduling step S044). Input data of the intelligent factory production scheduling includes the production-equipment predicted energy consumption information $EP_{pro}(T_{k+1})$, the carbon emission $CD(T_{k+1})$, the low-carbon product process $CR(T_{k+1})$ and the enterprise organization information $X_{ept}(T_k)$, e.g., a rated load of the equipment, the number of job, a product processing time, due date of the job, delay cost of the job, a time-of-use electricity price and a time-of-use carbon price. Output data of the intelligent factory production scheduling includes the optimal production scheduling information $IFP_{pro}(T_{k+1})$, the enterprise organization information $X_{ept}(T_k)$, $X_{pro}(T_k)$ and total energy consumption information $EC_{all}(T_k)$. In addition, the optimal production scheduling information $IFP_{pro}(T_{k+1})$, the past production line information $(T_k)$, the past environmental information $(T_k)$, the future environmental information $(T_{k+1})$ and the production power meter data $y_{pro}(T_k)$ are used as the inputs of the production energy consumption prediction module to predict an estimated energy consumption $\widehat{EC}_{pro}(T_{k+1})$ of an optimal production schedule.

In the production scheduling step S044, the production scheduling algorithm includes performing a mixed integer linear programming (MILP) to solve the optimal production scheduling information $IFP_{pro}(T_{k+1})$ for a minimum production cost. The minimum production cost is calculated as follows:

$$\min PC = w1_{PC}PC^{wait} + w2_{PC}PC^{pro} + w3_{PC}PC^{ele} + (1 - w1_{PC} - w2_{PC} - w3_{PC})PC^{ce}; \tag{1}$$

where min PC represents the minimum production cost; $wn_{PC}$ represents a production scheduling weight, and n is one of 1, 2 and 3; $PC^{wait}$ represents a delivery delay cost; $PC^{pro}$ represents a production cost; $PC^{ele}$ represents an electricity cost; and $PC^{ce}$ represents a carbon emission cost. In this embodiment, MILP comes from the IDS of Industry 4.1 and can solve the production schedule with minimum cost, but the present disclosure is not limited thereto.

The delivery delay cost is related to a completion time and a due date. The delivery delay cost is calculated as follows:

$$PC^{wait} = \sum_{j=1}^{J} \max(\max(F_{mj}) - D_j, 0)C_{wait,j}; \tag{2}$$

where $F_{mj}$ represents the completion time of job j on machine m (the production equipment 402); $D_j$ represents the due date of the job j; $C_{wait,j}$ represents the delay cost of the job j; and J represents the number of the job j.

Whether the job is executed determines whether the production cost is generated. The constraint of the production cost conforms to the following formula:

$$PC^{pro} = \sum_{m=1}^{M} \sum_{j=1,}^{J} O_{mj} \cdot C_{pro,mj}; \tag{3}$$

where M represents the number of machine m; $O_{mj}$ represents an execution status of job j on the machine m, $O_{mj}=1$ if the job j is processed on the machine m, and $O_{mj}=0$ otherwise; and $C_{pro,mj}$ represents the production cost of the job j on the machine m.

The electricity cost is a predicted power consumption multiplied by the time-of-use electricity price. The constraint of the electricity cost conforms to the following formula:

$$PC^{ce} = \sum_{m=1}^{M} \sum_{j=1}^{J} \sum_{i=B_{mj}}^{F_{mj}} O_{mj} \cdot (EP_{pro})_{j,m,i} \cdot P_i^E; \tag{4}$$

where $(EP_{pro})_{j,m,i}$ represents a power consumption of the job j executed on the machine m during period i; and $$P_i^E$$

represents the time-of-use electricity price for the period i.

The carbon emission cost includes a sum of direct and indirect carbon emissions of the machine multiplied by a carbon price. The constraint of the carbon emission cost conforms to the following formula:

$$PC^{ce}=\sum_{m=1}^{M}\sum_{j=1}^{J}\sum_{i=B_{mj}}^{F_{mj}}\left(CD_f+(EP_{pro})_{j,m,i}\cdot CEC_{ele}\right)\cdot O_{mj}P_i^C; \quad (5)$$

where $CD_{mj}$ represents a direct carbon emission of the job j executed on the machine m, which is obtained by a carbon disclosure; $CEC_{ele}$ represents an electricity carbon emission coefficient (indirect); and $$P_i^C$$

represents a time-of-use carbon price for the period i.

Each job will only be executed once. The constraint of the execution status of the job j on the machine m conforms to the following formula:

$$\sum_{m=1}^{M}O_{mj}\cdot 1,\ \forall\ j. \quad (6)$$

A starting time of the job must be greater than a completion time of a previous job plus a setup time. The constraint of the starting time conforms to the following formula:

$$B_{mj}\geq F_{mj'}+T_{mjj'}-\left(1-S_{mjj'}\right)\cdot L; \quad (7)$$

where $B_{mj}$ represents the starting time of the job j on the machine m; $F_{mj'}$ represents the completion time of job j' on the machine m; $T_{mjj'}$ represents a setup time from the job j' to the job j on the machine m; $S_{mjj'}$ represents a sequence status of the job j and the job j' on the machine m, $S_{mjj}=1$ if the job j' precedes the job j on the machine m, and $S_{mjj}=0$ otherwise; and L represents a large-value punishment constant.

The completion time of the job must be greater than the starting time of the job plus a processing time. The constraint of the completion time conforms to the following formula:

$$F_{mj}\geq B_{mj}+P_{mj}-(1-0_{mj})\cdot L; \quad (8)$$

where $P_{mj}$ represents the processing time of the job j on the machine m.

In the second stage (facility control Stage_II), past factory information ($T_k$), the past environmental information ($T_k$), future facility control parameter ($T_{k+1}$), the future environmental information ($T_{k+1}$) and facility power meter data $y_{fac}(T_k)$ are used as inputs of a facility energy consumption prediction module $EP_{fac}$ (an energy prediction step S042) to generate the factory-equipment predicted energy consumption information $EP_{fac}(T_{k+1})$. The factory-equipment predicted energy consumption information $EP_{fac}(T_{k+1})$ is used as a control reference of intelligent factory facility control $IFP_{fac}$ (the facility control step S046). Input data of the intelligent factory facility control includes the optimal production scheduling information $IFP_{pro}(T_{k+1})$, the factory-equipment predicted energy consumption information $EP_{fac}(T_{k+1})$, the carbon emission $CD(T_{k+1})$ and the enterprise organization information $X_{ept}(T_k)$, e.g., a rated load of the equipment, a time-of-use electricity price and a time-of-use carbon price. Output data of the intelligent factory facility control includes the optimal configuration combination information $IFP_{fac}(T_{k+1})$, e.g., a fan activation speed of an air conditioning system, and whether a humidifier is activated in a humidity system. The output data of the intelligent factory facility control further includes the enterprise organization information $X_{ept}(T_k)$, $X_{fac}(T_k)$ and total energy consumption information $EC_{all}(T_k)$. In addition, the optimal configuration combination information $IFP_{fac}(T_{k+1})$, the past factory information ($T_k$), the past environmental information ($T_k$), the future environmental information ($T_{k+1}$) and the facility power meter data $y_{fac}(T_k)$ are used as the inputs of the facility energy consumption prediction module to predict an estimated energy consumption $\widehat{EC}_{fac}(T_{k+1})$ of an optimal facility control.

In the facility control step S046, the facility control algorithm includes performing an optimization algorithm to solve the optimal configuration combination information $IFP_{fac}(T_{k+1})$ for a minimum factory cost. The minimum factory cost is calculated as follows:

$$\min FC=w_{FC}FC^{ele}+(1-w_{FC})FC^{ce}; \quad (9)$$

where min FC represents the minimum factory cost; $w_{FC}$ represents a facility control weight; $FC^{ele}$ represents an electricity cost; and $FC^{ce}$ represents a carbon emission cost. In this embodiment, the optimization algorithm can be a genetic algorithm and solve the facility control with minimum cost under the condition of the optimal environment (environmental temperature, humidity) of the production equipment 402. However, the present disclosure is not limited thereto.

The factory equipment 404 has a load, and the load cannot exceed a rated load. The constraint of the load conforms to the following formula:

$$0\leq\sum_{f=1}^{F}\text{Load}_f\leq\sum_{f=1}^{F}\text{Rated Load}_f; \quad (10)$$

where F represents the number of the factory equipment f, R represents a number of period i; $\text{Load}_f$ represents the load of the factory equipment f, and Rated $\text{Load}_f$ represents the rated load of the factory equipment f.

The factory equipment 404 has a facility load demand. In the period i, the operating status of the machines (e.g., the number of machines which are turned on) according to production scheduling is converted into an optimal facility production parameters (e.g., refrigeration tonnage of the air-conditioning equipment) through a table lookup. This parameter is the facility load demand. The facility load is greater than or equal to the facility load demand. The constraint of the facility load demand conforms to the following formula:

$$FLD\leq\sum_{f=1}^{F}\sum_{i=1}^{R}\text{Load}_{f,i}; \quad (11)$$

where FLD represents the facility load demand; and $Load_{f,i}$ represents a cumulative load provided from the factory equipment f during the period i.

The power consumption of the factory equipment 404 is predicted according to the facility parameter. The constraint of the power consumption conforms to the following formula:

$$\sum_{f=1}^{F}\sum_{\tau=1}^{T}(EP_{fac})_{f,\tau}=\sum_{f=1}^{F}\sum_{i=1}^{R}EP_{fac}(IFP_{fac})_{f,i}; \quad (12)$$

where F represents the number of the factory equipment f; T represents the number of period τ; R represents the number of period i; $(EP_{fac})_{f,\tau}$ represents a predicted power consumption of the factory equipment f during the period τ; $IFP_{fac}$ represents a facility parameter (e.g., a partial load rate (PLR), an ice water flow); and $EP_{fac}$ represents a factory-equipment energy prediction model.

The electricity cost of the factory equipment 404 is a predicted power consumption multiplied by the time-of-use electricity price. The constraint of the electricity cost conforms to the following formula:

$$FC^{ele}=\sum_{f=1}^{F}\sum_{i=1}^{R}(EP_{fac})_{f,i}\cdot P_i^E; \quad (13)$$

where $$P_i^E$$

represents a time-of-use electricity price for the period i; and $(EP_{fac})_{f,i}$ represents a predicted power consumption of the factory equipment f during the period i.

The carbon emission cost of the factory equipment 404 includes a sum of direct and indirect carbon emissions of the machine multiplied by a carbon price. The constraint of the carbon emission cost conforms to the following formula:

$$FC^{ce}=\sum_{f=1}^{F}\sum_{i=1}^{R}\left(CD_f+(EP_{fac})_{f,i}\cdot CEC_{ele}\right)\cdot P_i^c; \quad (14)$$

wherein $CD_f$ represents another carbon emission from a fugitive emission source, which is obtained by the carbon disclosure; $CEC_{ele}$ represents an electricity carbon emission coefficient (indirect); and $$P_i^C$$

represents a time-of-use carbon price for the period i.

In the third stage (microgrid integration Stage_III), past microgrid information $(T_k)$, the past environmental information $(T_k)$, the future environmental information $(T_{k+1})$ and microgrid power meter data $y_{mg}(T_k)$ are used as inputs of a renewable energy generation module $EP_{re}$ (an energy prediction step S042) to generate the renewable-energy-generator predicted power generation information $EP_{re}(T_{k+1})$. The renewable-energy-generator predicted power generation information $EP_{re}(T_{k+1})$ is used as a reference for power distribution optimization in intelligent microgrid integration IMG (the microgrid integration step S048). Input data of the intelligent microgrid integration (power distribution) includes the whole-factory optimal predicted total energy consumption information $\widehat{EC}_{all}(T_{k+1})$, the renewable-energy-generator predicted power generation information $EP_{re}(T_{k+1})$, the carbon neutrality information $GE(T_{k+1})$ and the carbon emission $CD(T_{k+1})$ from the carbon disclosure. Output data of the intelligent microgrid integration includes the optimal power distribution ratio information $IMG(T_{k+1})$.

In the microgrid integration step S048, the microgrid integration algorithm includes performing an optimization algorithm to solve the optimal power distribution ratio information $IMG(T_{k+1})$ for a minimum microgrid cost. The minimum microgrid cost is calculated as follows:

$$\min MC=w1_{MC}MC^C+w2_{MC}MC^O+w3_{MC}MC^{UG}+w4_{MC}MC^F+(1-w1_{MC}-w2_{MC}-w3_{MC}-w4_{MC})MC^E; \quad (15)$$

where min MC represents the minimum microgrid cost; $wn_{MC}$ represents a power distribution weight, and n is one of 1, 2, 3 and 4; $MC^C$ represents a carbon emission cost; $MC^O$ represents an equipment operation cost; $MC^{UG}$ represents an electricity cost; $MC^F$ represents a fuel cost; and $MC^E$ represents a charge-discharge efficiency cost. In this embodiment, the optimization algorithm can be a genetic algorithm to meet an electricity demand of whole-factory estimated total energy consumption and regulate an electricity supply ratio of a power company, an energy storage system, the renewable energy generator 4062 and a non-renewable energy generator, thereby solving the power distribution with minimum cost. However, the present disclosure is not limited thereto.

The carbon emission cost is calculated by the indirect carbon emission produced by the power company, the direct carbon emission produced by the non-renewable energy generator and the carbon price. The constraint of the carbon emission cost conforms to the following formula:

$$MC^C=\sum_{s=1}^{S}\sum_{g=1}^{G}\sum_{i=1}^{R}\left[CD_{g,i}^{nre}+\left(P_{s,i}^{BESS}\right)\cdot CEC_{ele}\right]\cdot P_i^C; \quad (16)$$

where $$CD_{g,i}^{nre}$$

represents the carbon emission of the non-renewable energy generator g during the period i, which is obtained by the carbon disclosure;

$$P_i^{UG}$$

represents the electricity generated from the power company during the period i;

$$i;\ P_{s,i}^{BESS}$$

represents the electricity generated from a battery energy storage system s during the period i; $CEC_{ele}$ represents the carbon emission coefficient (indirect) of the power company; and $$P_i^C$$

represents the carbon price during the period i.

The equipment cost is calculated by the cost of operating and maintaining the renewable energy generator 4062, a non-renewable energy generator and the battery energy storage system. The constraint of the equipment cost conforms to the following formula:

$$MC^O=\sum_{s=1}^{S}\sum_{g=1}^{G}\sum_{i=1}^{R}P_{g,i}^{re}\cdot C_g^{O,re}+P_{g,i}^{nre}\cdot C_g^{O,nre}+P_{s,i}^{BESS}\cdot C_s^{O,BESS};\quad (17)$$

where $$P_{g,i}^{re}$$

represents the electricity generated from the renewable energy generator g during the period i;

$$i;\ C_g^{O,re}$$

represents the cost of operating and maintaining the renewable energy generator g;

$$g;\ P_{g,i}^{nre}$$

represents the electricity generated from the non-renewable energy generator g during the period i;

$$i;\ C_g^{O,nre}$$

represents the cost of operating and maintaining the non-renewable energy generator g; and $$C_s^{O,BESS}$$

represents the cost of operating and maintaining the battery energy storage system s.

The electricity cost is calculated by the electricity generated from the power company and the electricity generated from the battery energy storage system multiplied by the time-of-use electricity price. The constraint of the electricity cost conforms to the following formula:

$$MC^{UG}=\sum_{s=1}^{S}\sum_{i=1}^{R}P_i^{UG}\cdot P_i^{E,UG}+P_{s,i}^{BESS}\cdot P_{s,i}^{E,BESS};\quad (18)$$

where $$P_i^{UG}$$

represents the electricity generated from the power company during the period i;

$$i;\ P_i^{E,UG}$$

represents the time-of-use electricity price of the power company during the period i; and $$P_{s,i}^{E,BESS}$$

represents the time-of-use electricity price of the battery energy storage system s during the period i.

The total fuel cost is calculated by the fuel consumption of the non-renewable energy generator multiplied by the fuel cost. The constraint of the total fuel cost conforms to the following formula:

$$MC^F=\sum_{g=1}^{G}\sum_{i=1}^{R}F_{g,i}^{nre}\cdot C_g^F;\quad (19)$$

where $$F_{g,i}^{nre}$$

represents the fuel consumption of the non-renewable energy generator g during the period i; and $$C_g^F$$

represents the fuel cost of the non-renewable energy generator g.

The electricity loss cost is calculated by the electricity loss during the charging and discharging process. The constraint of the electricity loss cost conforms to the following formula:

$$MC^E=\sum_{s=1}^{S}\sum_{i=1}^{R}\left[P_{s,i,ch}^{BESS}\cdot\left(1-\eta_{s,ch}^{BESS}\right)+P_{s,i,disch}^{BESS}\cdot\left(1-\eta_{s,disch}^{BESS}\right)\right]\cdot P_{s,i,ch}^{E,BESS};\quad (20)$$

where $$P_{s,i,ch}^{BESS}$$

represents the electricity charged into the battery energy storage system s during the period $$i;\ \eta_{s,ch}^{BESS}$$

BESS represents the charging efficiency of the battery energy storage system S;

$$s; P_{s,i,disch}^{BESS}$$

represents the electricity discharged from the battery energy storage system s during the period $$i; \eta_{s,disch}^{BESS}$$

represents the discharging efficiency of the battery energy storage system s; and $$P_{s,i,ch}^{E,BESS}$$

represents the time-of-use electricity price during charging of the battery energy storage system s during the period i.

The electricity demand and the electricity supply meet a balance. The constraint of the electricity demand and the electricity supply conforms to the following formula:

$$P_i^D - P_i^S = 0; \tag{21}$$

where $$P_i^D$$

represents the electricity demand during the period i; and $$P_i^S$$

represents the electricity supply during the period i.

The electricity demand is equal to a whole-factory optimal predicted total energy consumption. The constraint of the electricity demand conforms to the following formula:

$$P_i^D = \widehat{EC}_{all}(T_{k+1})_i; \tag{22}$$

where $\widehat{EC}_{all}(T_{k+1})_i$ represents the whole-factory optimal predicted total energy consumption during the period i. The whole-factory optimal predicted total energy consumption corresponds to a predicted total energy consumption of all factory loads.

The whole-factory optimal predicted total energy consumption is equal to a sum of the estimated energy consumptions after production scheduling and facility control. The constraint of the whole-factory optimal predicted total energy consumption conforms to the following formula:

$$\widehat{EC}_{all}(T_{k+1}) = \widehat{EC}_{pro}(T_{k+1}) + \widehat{EC}_{fac}(T_{k+1}); \tag{23}$$

where $\widehat{EC}_{all}(T_{k+1})$ represents the whole-factory optimal predicted total energy consumption information; $\widehat{EC}_{pro}(T_{k+1})$ represents an estimated energy consumption corresponding to the optimal production scheduling information $IFP_{pro}(T_{k+1})$ of the production equipment; and $\widehat{EC}_{fac}(T_{k+1})$ represents another estimated energy consumption corresponding to the optimal configuration combination information $IFP_{fac}(T_{k+1})$ of the factory equipment.

The electricity (actual power) generated from the non-renewable energy generator meets a rated capacity constraint. The rated capacity constraint conforms to the following formula:

$$P_{g,i,min}^{nre} < P_{g,i}^{nre} < P_{g,i,max}^{nre}; \tag{24}$$

where $$P_{g,i}^{nre}$$

represents the electricity generated from the non-renewable energy generator g during the period i;

$$i; P_{g,i,min}^{nre}$$

represents a minimum capacity of the non-renewable energy generator g; and $$P_{g,i,max}^{nre}$$

represents a maximum capacity of the non-renewable energy generator g.

The predicted output of the renewable energy generator is equal to the actual output of the renewable energy generator. The constraint of the predicted output of the renewable energy generator conforms to the following formula:

$$P_g^{re} = (EP_{re})_g; \tag{25}$$

where $$P_g^{re}$$

represents the actual output of the renewable energy generator g; $(EP_{re})_g$ represents the predicted output of the renewable energy generator g. If the predicted output is greater than a maximum rated capacity, the maximum rated capacity will be the predicted output.

The constraint of the state of charge of the battery energy storage system conforms to the following formula:

$$SOC_{s,i}^{BESS} = SOC_{s,i-1}^{BESS} + \frac{\left(P_{s,i,ch}^{BESS} \cdot \eta_{s,ch}^{BESS} - P_{s,i,disch}^{BESS} \cdot \eta_{s,disch}^{BESS}\right)}{P_{s,r}^{BESS}}; \tag{26}$$

where $$SOC_{s,i}^{BESS}$$

represents the state of charge of the battery energy storage system s during the period i;

$$i;\ SOC_{s,i-1}^{BESS}$$

represents the state of charge of the battery energy storage system s during the period i−1 (the (i−1)th period);

$$P_{s,i,ch}^{BESS}$$

represents the electricity charged into the battery energy storage system s during the period $$i;\ \eta_{s,ch}^{BESS}$$

represents the charging efficiency of the battery energy storage system $$s;\ P_{s,i,disch}^{BESS}$$

represents the electricity discharged from the battery energy storage system s during the period $$i;\ \eta_{s,disch}^{BESS}$$

represents the discharging efficiency of the battery energy storage system s; and $$P_{s,r}^{BESS}$$

represents the rated capacity of the battery energy storage system s.

The state of charge of the battery energy storage system meets an energy storage constraint. If the state of charge is less than or equal to a minimum state of charge or greater than or equal to a maximum state of charge, it will affect the remaining life of the battery. The energy storage constraint conforms to the following formula:

$$SOC_{s,i,min}^{BESS} < SOC_{s,i}^{BESS} < SOC_{s,i,max}^{BESS}; \tag{27}$$

where $$SOC_{s,i,min}^{BESS}$$

represents the minimum state of charge of the battery energy storage system s during the period i; and $$SOC_{s,i,max}^{BESS}$$

represents the maximum state of charge of the battery energy storage system s during the period i.

The electricity charged into the battery energy storage system meets a maximum energy storage charging constraint. The maximum energy storage charging constraint conforms to the following formula:

$$P_{s,i,ch}^{BESS} \leq P_{s,ch,max}^{BESS}; \tag{28}$$

where $$P_{s,ch,max}^{BESS}$$

represents the maximum charging amount of the battery energy storage system s during the period i.

The electricity charged into the battery energy storage system meets a maximum energy storage discharging constraint. The maximum energy storage discharging constraint conforms to the following formula:

$$P_{s,i,disch}^{BESS} \leq P_{s,disch,max}^{BESS}; \tag{29}$$

where $$P_{s,disch,max}^{BESS}$$

represents the maximum discharging amount of the battery energy storage system s during the period i.

In FIG. 2, the intelligent energy management method S0 further includes performing an intelligent carbon management step S06. The intelligent carbon emission management system iCMS is configured to perform the intelligent carbon management step S06. The intelligent carbon management step S06 includes performing a carbon disclosure step S062, a carbon reduction step S064 and a carbon neutrality step S066. The carbon disclosure step S062 includes configuring the processor 300 to obtain an inventory data by performing carbon inventory on the manufacturing device, and then provide the inventory data to a plurality of cyber physical agents (CPAs), and generate product raw material information corresponding to a product. The inventory data includes the carbon emission $CD(T_{k+1})$. The carbon reduction step S064 includes configuring the processor 300 to improve the low-carbon product process $CR(T_{k+1})$ of the product based on the product raw material information so as to reduce the carbon emission $CD(T_{k+1})$. The carbon neutrality step S066 includes configuring the processor 300 to realize a net zero principle according to a low-carbon energy allocation method when the carbon emission $CD(T_{k+1})$ no longer be reduced through the low-carbon product process $CR(T_{k+1})$ at a present stage. The low-carbon energy allocation method includes a carbon credit or a carbon offset.

Therefore, the intelligent energy management system 100 and the intelligent energy management method S0 of the present disclosure can achieve cost-minimized scheduling and effectively reduce carbon emissions and energy consumption by simultaneously integrating production scheduling, facility control, microgrid integration and carbon emission management. In addition, using the results of production scheduling and facility control as the constraint of the electricity demand can ensure that the electricity supply can meet the electricity demand to stabilize the balance of the power system while taking into account the reduction of energy consumption and carbon emissions, thereby accelerating the realization of the goals of green smart manufacturing and net-zero carbon emissions.

Figure 4A:
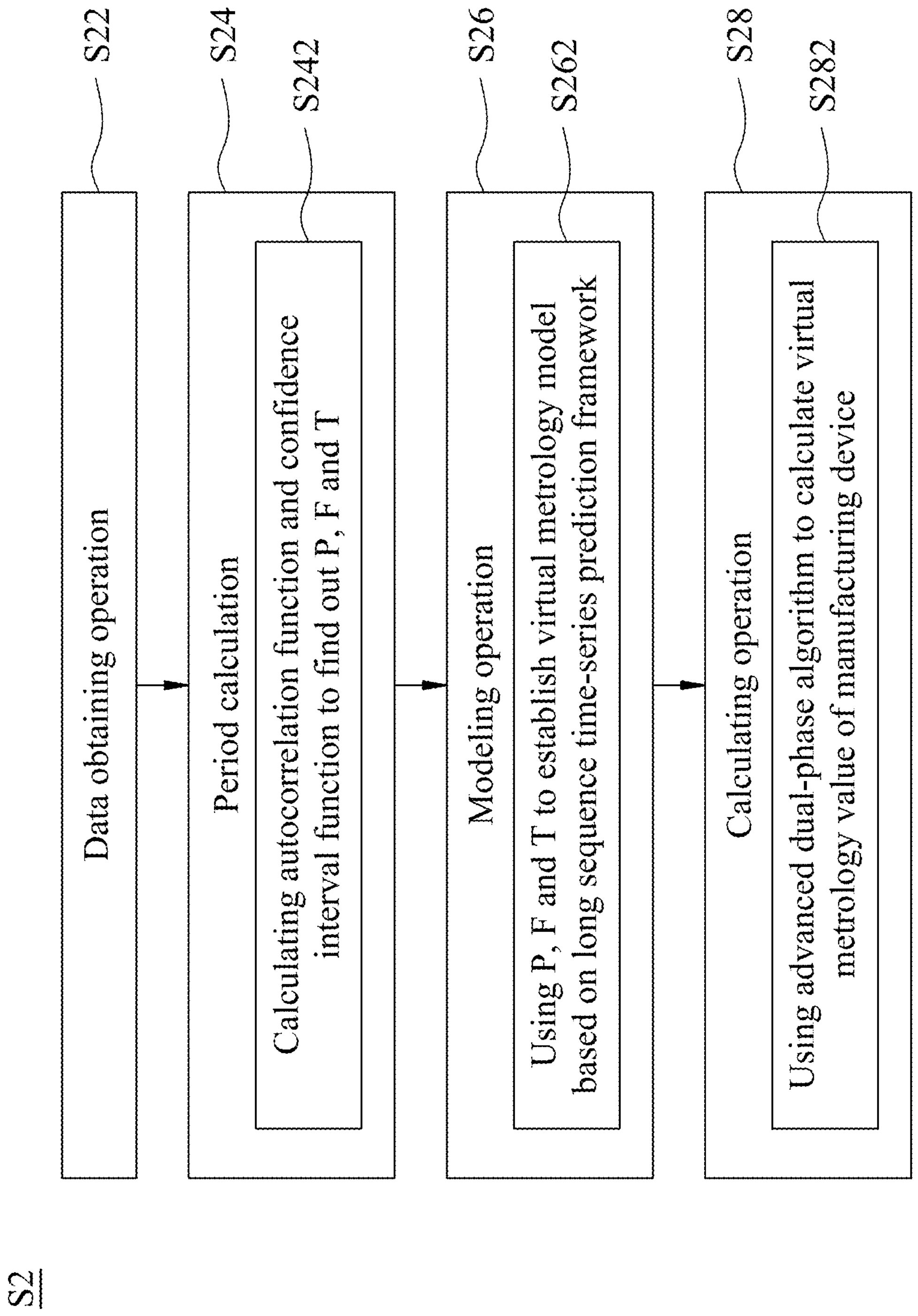
FIG. 4A shows a flow chart of an automatic virtual metrology algorithm of an energy prediction step of the intelligent energy management method of FIG. 2.
Figure 4B:
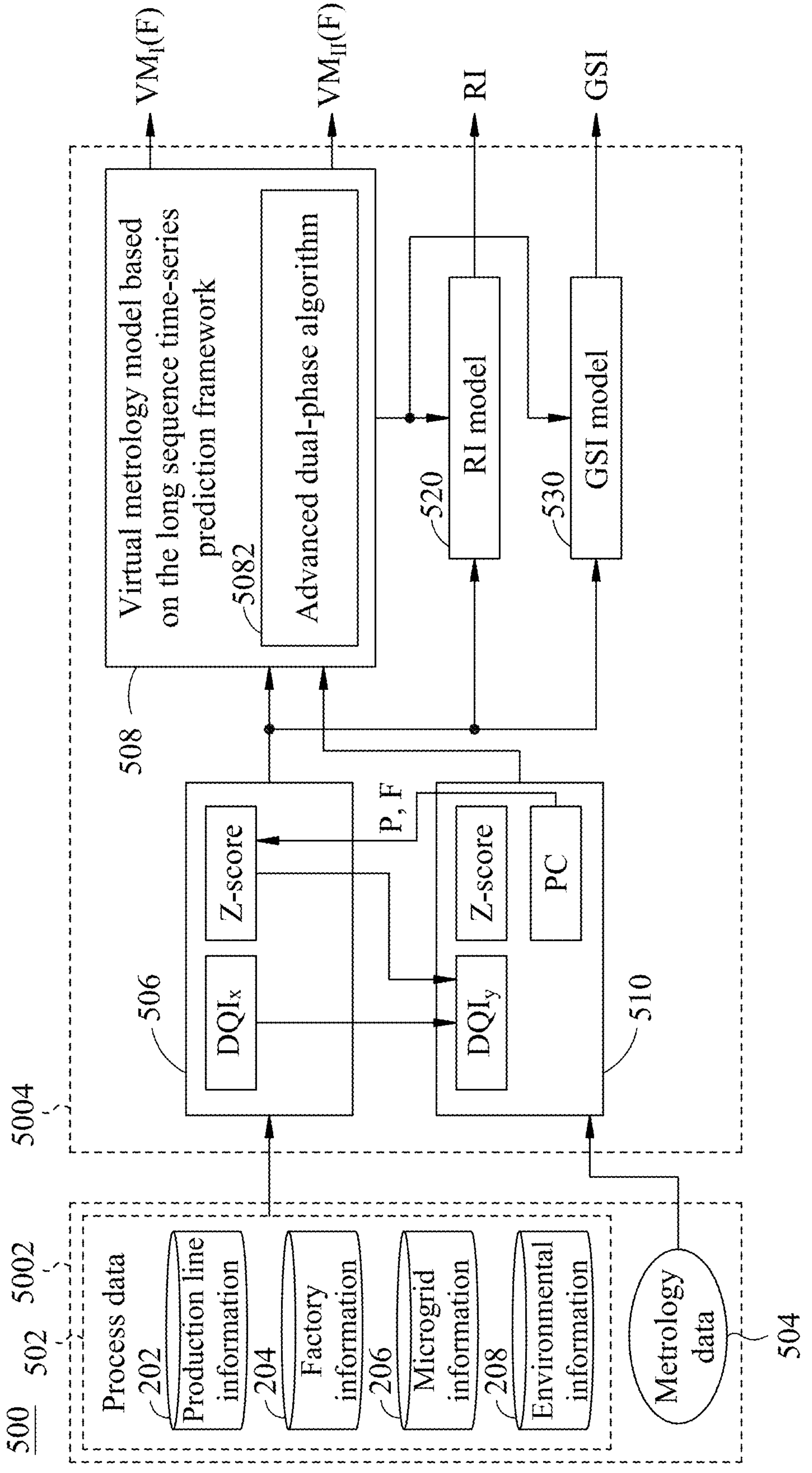
FIG. 4B shows a schematic view of an automatic virtual metrology system applied to the automatic virtual metrology algorithm of FIG. 4A.

Referring to FIGS. 1, 2, 3, 4A and 4B. FIG. 4A shows a flow chart of an automatic virtual metrology algorithm S2 of an energy prediction step S042 of the intelligent energy management method S0 of FIG. 2. FIG. 4B shows a schematic view of an automatic virtual metrology system 500 applied to the automatic virtual metrology algorithm S2 of FIG. 4A. The automatic virtual metrology algorithm S2 includes a plurality of steps S22, S24, S26, S28.

The step S22 is "Data obtaining operation", and includes configuring the automatic virtual metrology system 500 to obtain a plurality of sets of process data 502 and a plurality of metrology data 504. The sets of process data 502 include past data and future data of a manufacturing device relative to a time point. The metrology data 504 include a plurality of actual measurement values of a measurement device.

The step S24 is "Period calculation", and includes performing a period calculation operation S242. The period calculation operation S242 includes configuring the automatic virtual metrology system 500 to calculate the sets of process data 502 and the metrology data 504 according to an autocorrelation function (ACT) and a confidence interval (CI) function of the autocorrelation function so as to find out a memorizing length P, a forecasting length F and a full-periodic pattern length T for a long sequence time-series prediction framework.

The step S26 is "Modeling operation", and includes performing a modeling operation S262. The modeling operation S262 includes configuring the automatic virtual metrology system 500 to use the memorizing length P, the forecasting length F and the full-periodic pattern length T to establish a virtual metrology model 508 based on the long sequence time-series prediction framework. The virtual metrology model 508 based on the long sequence time-series prediction framework includes at least one deep learning network model.

The step S28 is "Calculating operation", and includes performing a calculating operation S282. The calculating operation S282 includes configuring the automatic virtual metrology system 500 to obtain at least one of another set of process data and another actual measurement value of the manufacturing device, and executing one of a first step (Phase I) and a second step (Phase II) according to whether the another actual measurement value is obtained, thereby calculating one of a phase-one virtual metrology value $VM_I$ and a phase-two virtual metrology value $VM_{II}$ of the manufacturing device. The first step (Phase I) includes calculating the phase-one virtual metrology value $VM_I$ by the another set of process data according to the virtual metrology model 508 based on the long sequence time-series prediction framework, and the second step (Phase II) includes calculating the phase-two virtual metrology value $VM_{II}$ of the manufacturing device by the another set of process data and the another actual measurement value according to the virtual metrology model 508 based on the long sequence time-series prediction framework.

Specifically, the phase-one virtual metrology value $VM_I$ can be one of the production-equipment predicted energy consumption information $EP_{pro}(T_{k+1})$, the factory-equipment predicted energy consumption information $EP_{fac}(T_{k+1})$, the renewable energy-generator predicted power generation information $EP_{re}(T_{+1})$, the estimated energy consumption $\widehat{EC}_{pro}(T_{k+1})$ of the optimal production schedule and the estimated energy consumption $\widehat{EC}_{fac}(T_{k+1})$ of the optimal facility control. In addition, the manufacturing device includes the production equipment 402, the factory equipment 404 and the microgrid equipment 406. The measurement device includes a power meter (e.g., a production power meter PPM, a facility power meter FPM or a microgrid power meter MPM in FIG. 3). The sets of process data 502 includes the production line information 202 of the production equipment 402, the factory information 204 of the factory equipment 404, the microgrid information 206 of the microgrid equipment 406 and the environmental information 208. Each of the phase-one virtual metrology value $VM_I$ generated in the first step and the phase-two virtual metrology value $VM_{II}$ generated in the second step is configured to control the manufacturing device, thereby updating the actual measurement values of the power meter.

The automatic virtual metrology algorithm S2 and the automatic virtual metrology system 500 of the present disclosure are equipped with the capabilities of automatic data acquisition, automatic data quality evaluation, automatic model fanning out and automatic model refreshing, thus being capable of significantly saving time for manual data quality evaluation and modeling and suitable for whole-factory construction and deployment of virtual metrology. In addition, in order to automatically evaluate the quality of the data and the reliance of the evaluation results, the automatic virtual metrology system 500 includes the virtual metrology model 508 based on the long sequence time-series prediction framework and following functional modules: (1) a process data preprocessing module 506, which is configured to real-time evaluate the quality of the sets of process data 502 (based on a process data quality index ($DQI_X$) model) and standardize the sets of process data 502, and preprocess the format of the sets of process data 502 by the memorizing length P, the forecasting length F generated from a period calculator (PC) of a metrology data preprocessing module 510. After preprocessing, only normal process data 502 can be used in the evaluation model for real-time quality evaluation. (2) a metrology data preprocessing module 510, which is configured to real-time evaluate the quality of the metrology data 504 (based on a metrology data quality index ($DQI_y$) model) and standardize the metrology data 504, and preprocess the format of the metrology data 504 by the memorizing length P, the forecasting length F generated from the period calculator (PC). Only normal metrology data 504 after preprocessing can be used to fine-tune or retrain the evaluation model to increase accuracy of the evaluation model. (3) a reliance index (RI) model 520, which is configured to evaluate the reliance of the evaluation results. (4) a global similarity index (GSI) model 530, which is configured to evaluate global similarity between a current set of process data 502 and the historical process data 502 used for modeling, and assist the reliance indicator to more accurately evaluate the evaluation results.

The abovementioned RI model 520, the GSI model 530, the $DQI_X$ model and the $DQI_y$ model may refer to U.S. Pat. No. 8,095,484 B2. U.S. Pat. No. 8,095,484 B2 is hereby incorporated by reference. In addition, the automatic virtual metrology system 500 includes a memory 5002 and a processor 5004. The memory 5002 may be different from the memory 200 of FIG. 1, and the processor 5004 may be different from the processor 300 of FIG. 1. In other embodiments, the memory 5002 may be the same as the memory 200, and the processor 5004 may be the same as the processor 300, but the present disclosure is not limited thereto.

Figure 5:
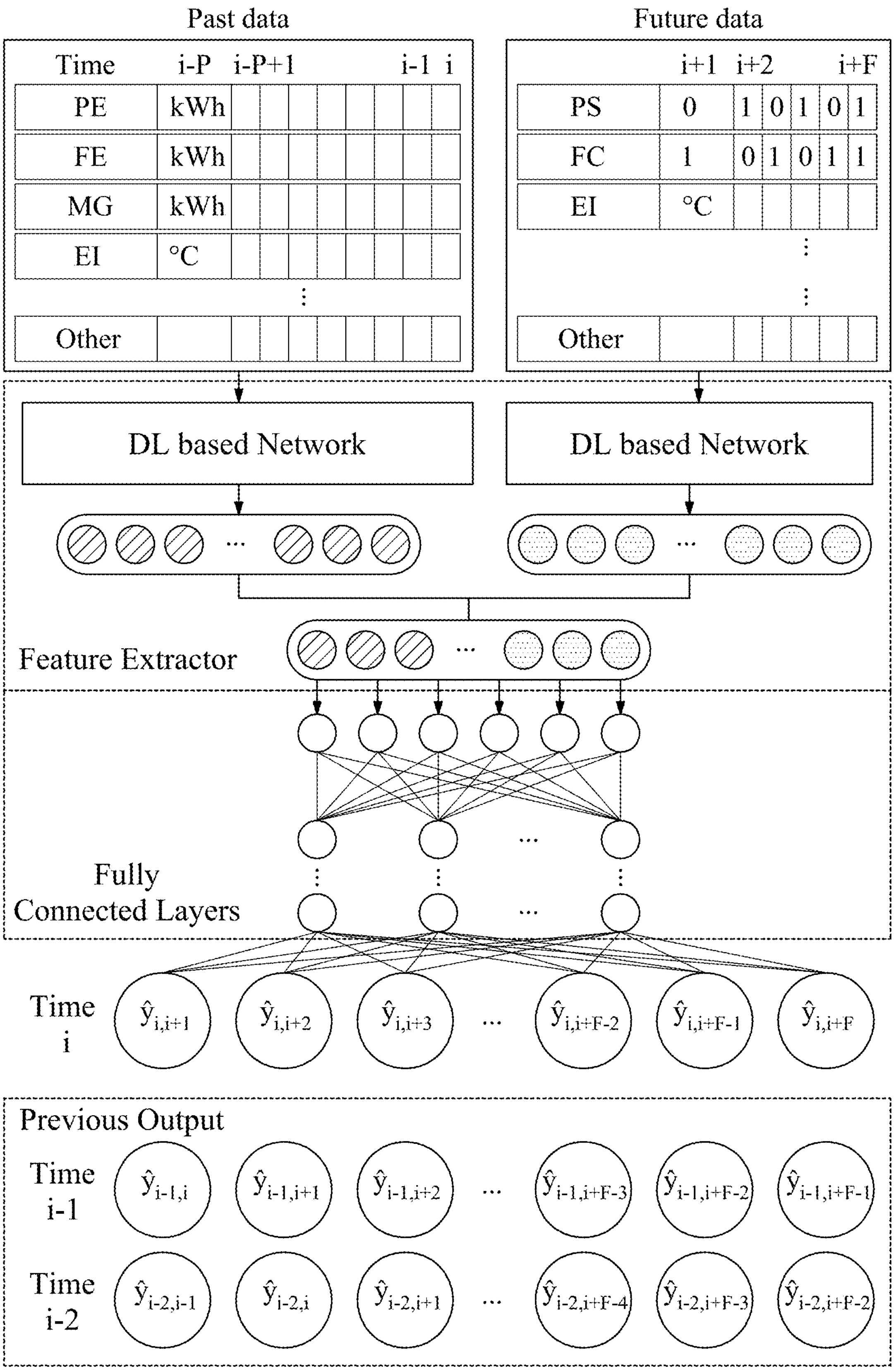
FIG. 5 shows a schematic view of a deep learning based network of a long sequence time-series prediction framework and input-output correlation of the present disclosure.

Referring to FIGS. 1, 2, 3, 4A, 4B and 5. FIG. 5 shows a schematic view of a deep learning based network of a long sequence time-series prediction framework and input-output correlation of the present disclosure. The data sources of the automatic virtual metrology algorithm S2 and the automatic virtual metrology system 500 of the present disclosure are data of factory, environment, company decision-making ($T_{k+1}$ period) and equipment power meters ($T_k$ period). For example, in energy prediction, it is necessary to collect the entire historical data ($T_{k+1}$ period) of the power meters, each equipment information (e.g., energy consumption (kWh) of an ice water machine, a chilled water flow rate (L/sec), a cooling water temperature (° C.), inlet and outlet water pressures (In) and refrigeration tonnage (RT) in an ice water system), environmental information (e.g., an outdoor temperature (° C.), a dew point temperature (C), humidity (%) and a wind speed (Mph)) and company decision-making (e.g., a production work order). Through the automatic virtual metrology algorithm S2, a changing type at the previous time point can be memorized in the virtual metrology model 508 based on the long sequence time-series prediction framework, and a changing trend at the next time point can be predicted based on the previous internal state and input. For example, high temperatures in summer and low temperatures in winter can be memorized, and the changing trend of temperature and possible abnormalities at the next time point can be predicted by learning the changing types of the temperatures, such as snowstorms or high temperature warnings.

The virtual metrology model 508 based on the long sequence time-series prediction framework of the present disclosure is an enhanced model. The virtual metrology model 508 based on the long sequence time-series prediction framework not only considers historical information, but also considers future information (such as temperature and humidity predicted by the meteorological bureau, scheduling results, etc.) used as features of the input model for accuracy of future prediction. The advantage of the long sequence time-series prediction framework which is divided into two different input sources (the past data and the future data) is that the model can perform different feature extractions on different input data, and after merging the extraction results from both feature extractions, the predicted value is finally outputted for a certain period of time in the future. The number of sample points referenced in the past is defined as the memorizing length P. The memorizing length P is used as a reference for information in the past time, including the energy consumption values collected by the power meter in the past time and indoor and outdoor temperature and humidity. The number of sample points referenced in the future is defined as the forecasting length F. The forecasting length F is used as a reference for information in the future time, including scheduling results, control results and temperature and humidity predicted by the meteorological bureau, as shown in FIG. 5. The two variables of the memorizing length P and the full-periodic pattern length T are automatically searched by the period calculator (PC) in the automatic virtual metrology system 500 based on the long sequence time-series prediction framework. The memorizing length P and the forecasting length F not only greatly affect accuracy of the model, but also are the basis for data processing. The data preprocessing module will compile the data into a form usable by the virtual metrology model 508 based on the long sequence time-series prediction framework according to the two variables of the memorizing length P and the forecasting length F for model training and prediction. The past data include data of production equipment (PE), factory equipment (FE), microgrid (MG) and environmental information (EI). The future data include production scheduling (PS), facility control (FC) and environmental information (EI).

Figure 6:
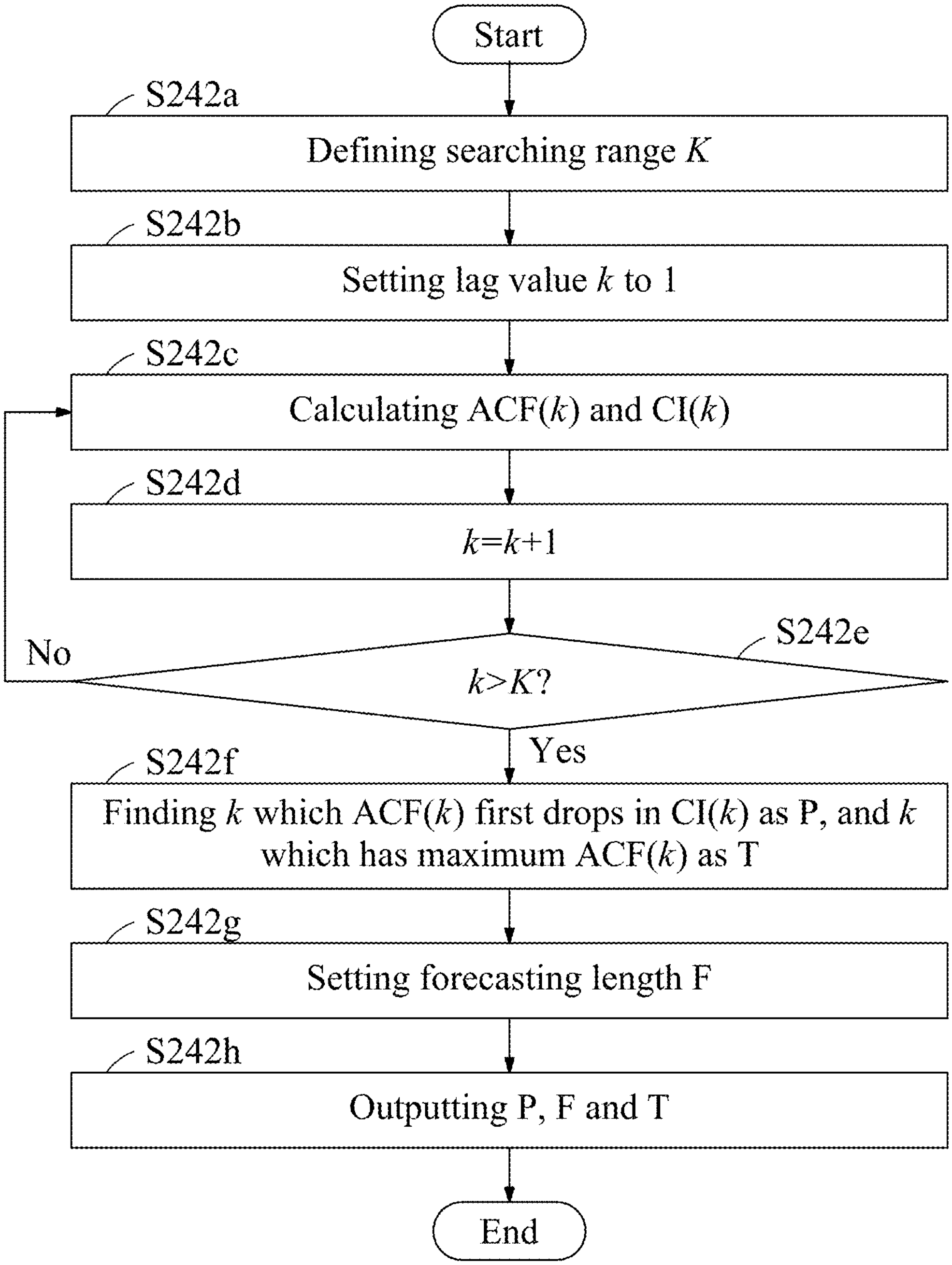
FIG. 6 shows a flow chart of a period calculating operation of the present disclosure.

Referring to FIGS. 4A, 4B, 5 and 6. FIG. 6 shows a flow chart of a period calculating operation S242 of the present disclosure. The period calculation operation S242 further includes performing a first period calculating step S242*a*, a second period calculating step S242*b*, a third period calculating step S242*c*, a fourth period calculating step S242*d*, a fifth period calculating step S242*e*, a sixth period calculating step S242*f*, a seventh period calculating step S242*g* and an eighth period calculating step S242*h*.

The first period calculating step S242*a* includes defining a searching range K, and the searching range K is a positive integer greater than 1. The second period calculating step S242*b* includes setting a lag value k to 1. The third period calculating step S242*c* includes calculating the sets of process data 502 and the metrology data 504 according to the autocorrelation function and the confidence interval function of the autocorrelation function to generate an autocorrelation function value ACF(k) and a confidence interval CI(k). The fourth period calculating step S242*d* includes adding the lag Value k by 1 to generate an added lag value (k+1), and then setting the lag value k to the added lag value (k+1). The fifth period calculating step S242*e* includes judging whether the lag value k exceeds the searching range K to generate a judgment result, and then determining the full-periodic pattern length T according to the judgment result. The sixth period calculating step S242*f* is “Finding k which ACF(k) first drops in CI(k) as P, and k which has maximum ACF(k) as T”, and includes finding the lag value k when the autocorrelation function value ACF(k) falls into the confidence interval CI(k) at the first time, and setting the memorizing length P to the lag value k when the autocorrelation function value ACF(k) falls into the confidence interval CI(k) at the first time, and finding the lag value k of the largest one of the autocorrelation function value ACF(k) that exceeds the memorizing length P, and setting the full-periodic pattern length T to the lag value k of the largest one of the autocorrelation function value ACF(k). The seventh period calculating step S242*g* includes setting the forecasting length F according to the memorizing length P, and the forecasting length F is a multiple of the memorizing length P. The eighth period calculating step S242*h* includes outputting the memorizing length P, the forecasting length F and the full-periodic pattern length T. When the judgment result of the fifth period calculating step S242*e* is yes, the sixth period calculating step S242*f* is performed; when the judgment result of the fifth period calculating step S242*e* is no, the third period calculating step S242*c* is reperformed.

The memorizing length P and the forecasting length F will affect accuracy of the prediction model. The full-periodic pattern length T is the basis for updating model. The memorizing length P and the full-periodic pattern length T can be automatically searched by the period calculator (PC) in the automatic virtual metrology system 500 based on the long sequence time-series prediction framework. The forecasting length F can be set by a user. In one embodiment, a multiple of the memorizing length P is used as the forecasting length F, but the present disclosure is not limited thereto. The period calculator (PC) performs automatically searching by using the autocorrelation function and the confidence interval function of the autocorrelation function. The autocorrelation function is a statistical tool used in time series analysis to measure an autocorrelation between different time points in a time series. In other words, the autocorrelation function is used to assess the correlation between a variable and itself at different time points.

The autocorrelation function and the confidence interval function of the autocorrelation function conforms to the following formula:

$$ACF(k) = \frac{\sum_{i=1}^{N-k}\left(D(i) - \overline{D}\right)\left(D(i+k) - \overline{D}\right)}{\sum_{i=1}^{N}\left(D(i) - \overline{D}\right)^2}; \tag{30}$$

$$CI(k) = \pm Z_{1-\alpha/2}\sqrt{\frac{1}{N}\left(1 + 2\sum_{i=1}^{k} ACF(k)^2\right)}; \tag{31}$$

where D(i) represents time series data without lag; D(i+k) represents the time series data with lag k; D represents average time series data; Z represents a Z-score value (standardized value); a represents a confidence level index; N represents a length of the time series data; and k represents the lag value.

Figure 7A:
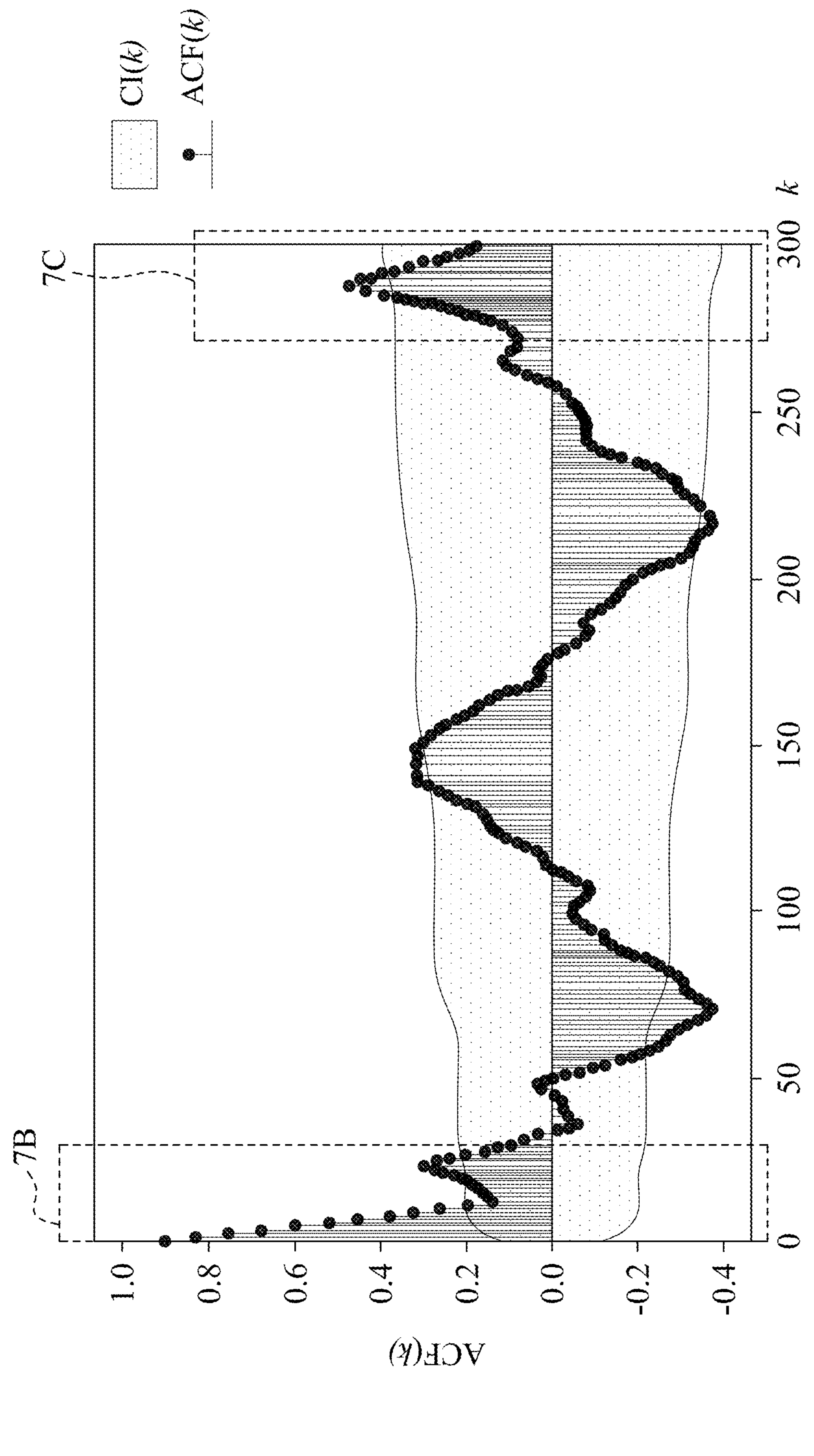
FIG. 7A shows a schematic view of an automatic searching result of the period calculating operation of the present disclosure.
Figure 7B:
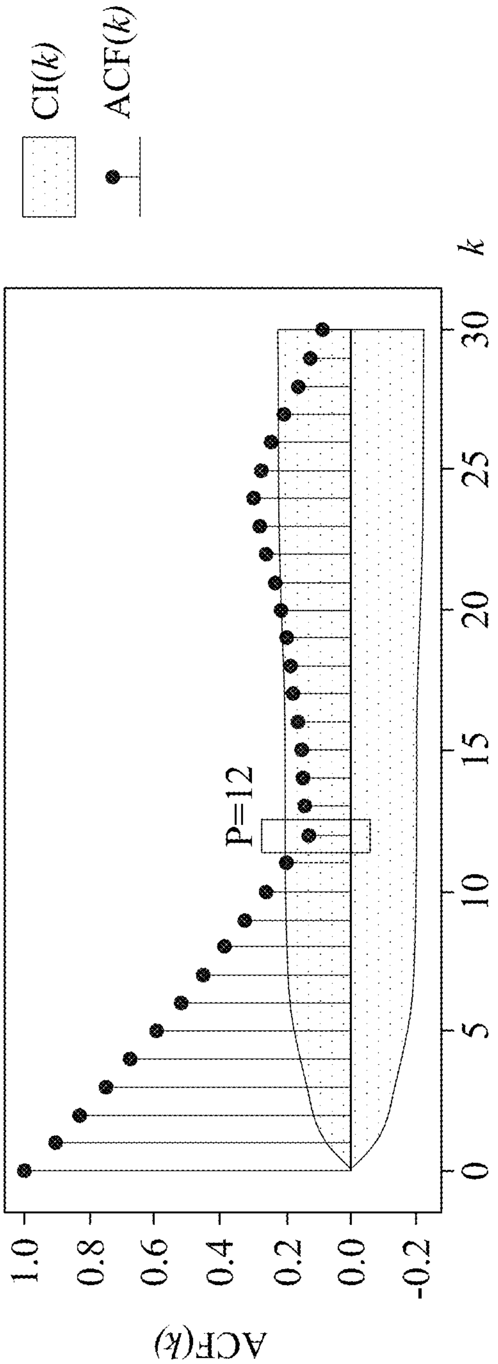
FIG. 7B shows an enlarged schematic view of a part of the automatic searching result of FIG. 7A.
Figure 7C:
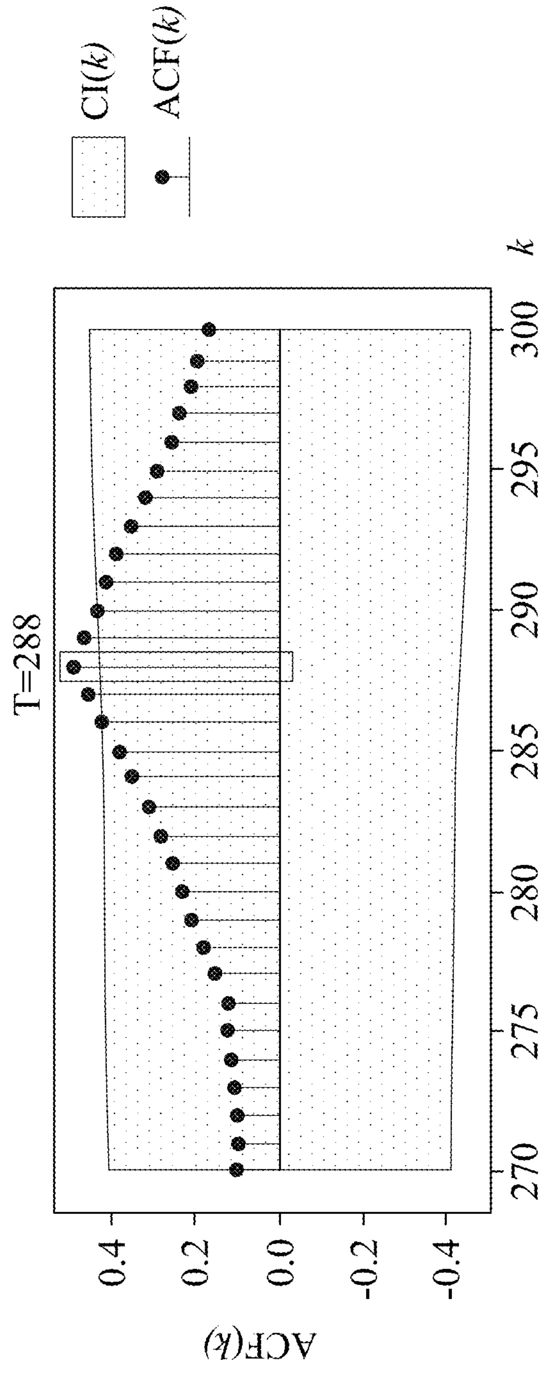
FIG. 7C shows an enlarged schematic view of another part of the automatic searching result of FIG. 7A.

Referring to FIGS. 6, 7A, 7B and 7C. FIG. 7A shows a schematic view of an automatic searching result of the period calculating operation S242 of the present disclosure. FIG. 7B shows an enlarged schematic view of a part of the automatic searching result of FIG. 7A. FIG. 7C shows an enlarged schematic view of another part of the automatic searching result of FIG. 7A. In the embodiment, the memorizing length P and the full-periodic pattern length T are automatically searched when the searching range K=300, the confidence level index α=0.95, and the length of the time series data N=300. It is obvious that the lag value k is 12 when the autocorrelation function value ACF(k) falls into the confidence interval CI(k) at the first time, so that memorizing length P is set to 12. The lag value k of the largest one of the autocorrelation function value ACF(k) that exceeds the memorizing length P is 288, so that the full-periodic pattern length T is set to 288.

Figure 8:
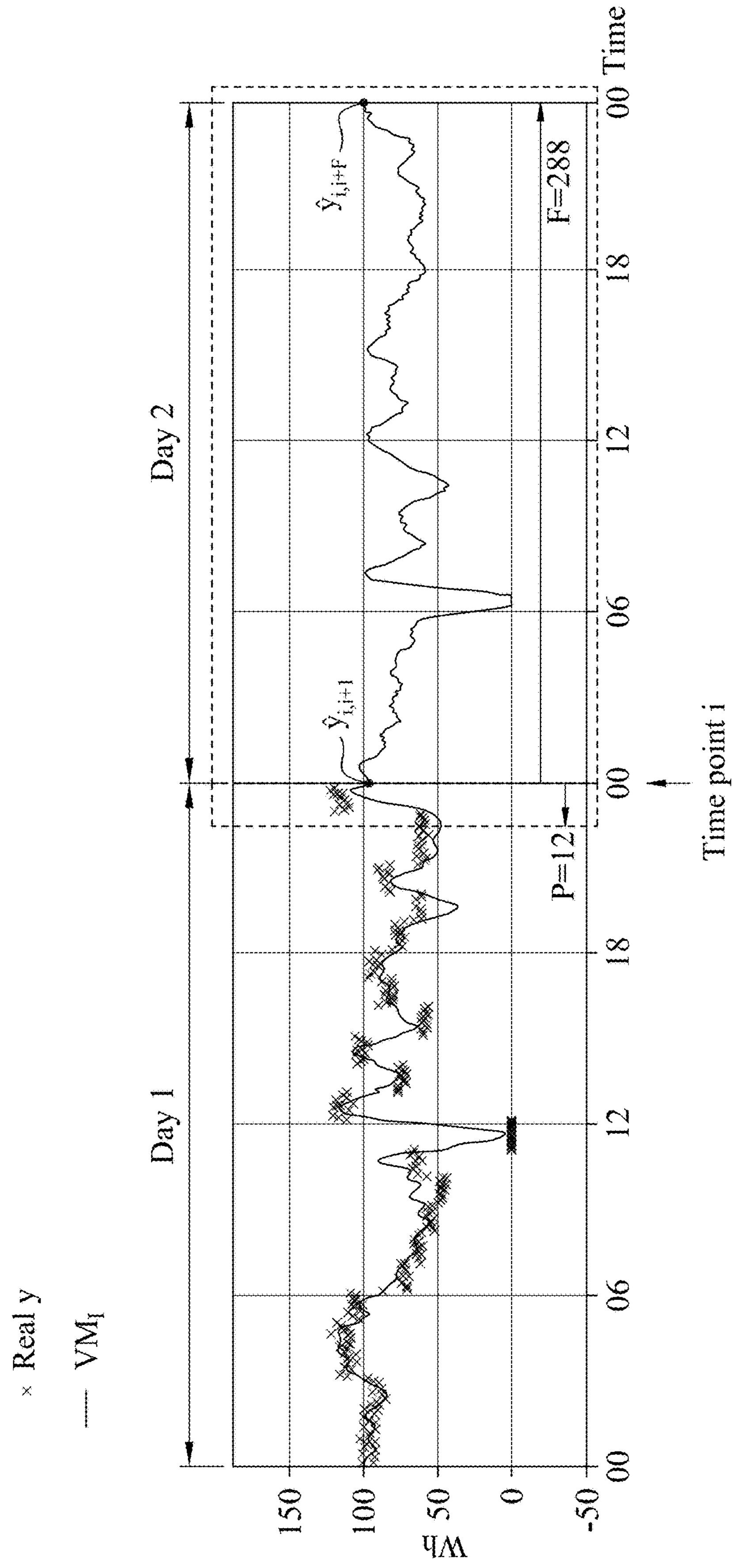
FIG. 8 shows a schematic view of an energy consumption prediction result based on the long sequence time-series prediction framework of the present disclosure.

Referring to FIGS. 4A, 4B, 5, 6, 7A, 7B, 7C and 8. FIG. 8 shows a schematic view of an energy consumption prediction result based on the long sequence time-series prediction framework of the present disclosure. In the embodiment, the energy consumption prediction is performed in one day before time point i (Day 1) and one day after time point i (Day 2). The solid curve represents a model prediction result (i.e., the phase-one virtual metrology value $VM_I$), and the symbol "x" represents actual values (i.e., Real y). The model refers to the past data of past points (P=12, i.e., the number of the past points is 12) as the input of the model at time point i, and outputs predicted values ($\hat{y}_{i,i+1}$, $\hat{y}_{i,i+2}$, . . . , $\hat{y}_{i,i+F}$, F=288, i.e., the number of the predicted values is 288) at time point i. $\hat{y}_{i,i+1}$ is the predicted value of time point i+1 relative to time point i, and $\hat{y}_{i,i+F}$ is the predicted value of time point i+F relative to time point i. In order to measure the model performance, the present disclosure uses mean average percentage error (MAPE) as a measurement index. The MAPE conforms to the following formula:

$$MAPE = \frac{\sum_{i=1}^{N}\left|\frac{\hat{y}_{i,j} - y_j}{\max(y_{train})}\right| * 100\%}{N}; \tag{32}$$

where $\hat{y}_{i,j}$ represents the predicted value of time point j calculated based on time point i, and j=i+1; $y_j$ represents the actual value of time point j; $y_{train}$ represents the set of the actual values of training samples; N represents the total number of samples in calculation of MAPE. In FIG. 8, it is obvious that the predicted values are very close to the actual values, thus indicating that the prediction performance is good, and the MAPE is 4.402%.

Figure 9:
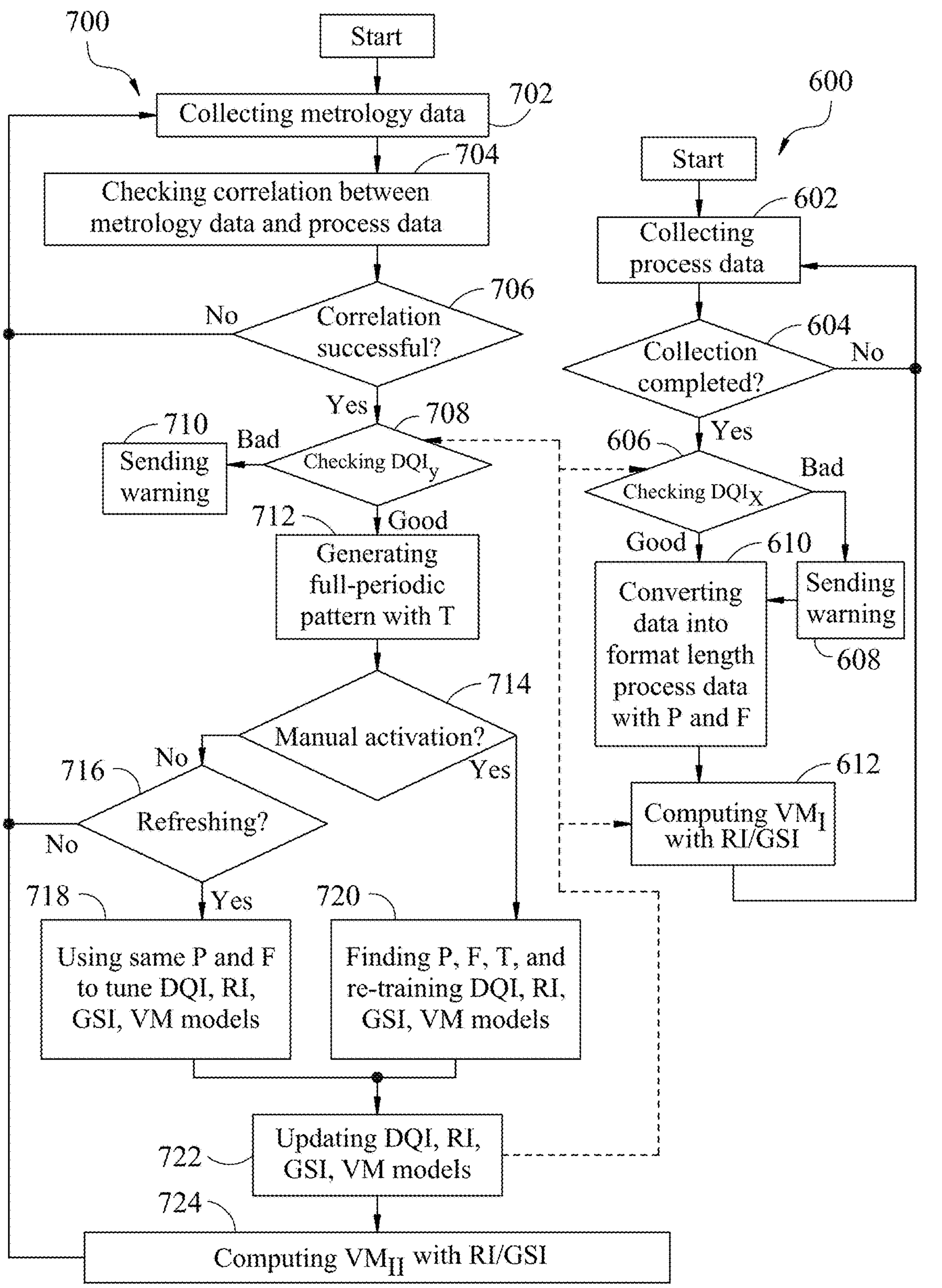
FIG. 9 shows a flow chart of an advanced dual-phase algorithm of a calculating operation of FIG. 4A.

Referring to FIGS. 4A, 4B and 9. FIG. 9 shows a flow chart of an advanced dual-phase algorithm 5082 of a calculating operation S282 of FIG. 4A. In the calculating operation S282, in response to determining that the another actual measurement value is not obtained, performing a first step 600 to calculate the phase-one virtual metrology value $VM_I$ of the manufacturing device. In contrast, in response to determining that the another actual measurement value is obtained, performing the second step 700 to calculate the phase-two virtual metrology value $VM_{II}$ of the manufacturing device.

The first step 600 mainly focuses on real-time application. When new data is collected, a process data quality index ($DQI_X$) checking algorithm is performed to confirm the data quality. If the data quality is bad, a warning is sent immediately. When the data quality checking is completed, the phase-one virtual metrology value $VM_I$ and its corresponding reliance index (RI) and global similarity index (GSI) are output immediately.

In the first step 600, first, a step 602 is performed to collect the process data 502 of a process device. Next, a step 604 is performed to check whether the collection of the process data 502 of the process device is completed. If the result of the step 604 is no, the step 602 is performed continually. If the result of the step 604 is yes, a step 606 is performed to check the $DQI_X$ of the process data 502. If the result of the step 606 is bad, it represents that the process data 502 is abnormal data, and a warning is sent (a step 608). If the result of the step 606 is good, it represents that the process data 502 is normal data, and a step 610 is performed. The step 610 includes converting another set of process data 502 of the manufacturing device into a set of format length process data according to the memorizing length P and the forecasting length F. Finally, a step 612 is performed and includes inputting the set of format length process data of the manufacturing device into the virtual metrology model 508 based on the long sequence time-series prediction framework, thereby calculating the phase-one virtual metrology value $VM_I$ of the manufacturing device.

The main task of the second step 700 is to obtain a parameter from the period calculating operation S242. The parameter, i.e., the full-periodic pattern length T, is very important for model updating. The full-periodic pattern length T can be automatically searched to be obtained by the period calculator (PC). When new paired data are collected, a metrology data quality index ($DQI_y$) checking algorithm is performed to confirm the data quality. When the $DQI_y$ checking algorithm confirms that the metrology data 504 is bad, a warning is sent. After confirming the data quality of the metrology data 504, three steps will be taken to improve the accuracy. The first of the three steps is to generate a full-periodic pattern, i.e., integrate the data into the full-periodic pattern based on full-periodic pattern length T as the basis for subsequent judgment of model updating. The second of the three steps is to perform manual activation, i.e., when future trends are expected to change significantly (e.g., seasonal changes, substantial changes in schedules or replacement of old and new factory equipment), the model can be forced to perform re-training. The period calculator (PC) is reused to find the memorizing length P, the forecasting length F and the full-periodic pattern length T, and re-train the DQI model, the RI model 520, the GSI model 530 and a VM model with the newly found memorizing length P, the newly found forecasting length F and the newly found full-periodic pattern length T (the VM model in this embodiment is the virtual metrology model 508 based on the long sequence time-series prediction framework). The third of the three steps is to perform refreshing, i.e., judging whether the model needs to be refreshed (tuning), e.g., the MAPE does not meet an accuracy threshold. If so, the same memorizing length P and the same forecasting length F are used to tune the DQI model, the RI model 520, the GSI model 530 and the VM model.

In the second step 700, first, a step 702 is performed to collect the actual metrology data 504 of the power meter. Next, a step 704 is performed to perform correlation check between the metrology data 504 and each of the production line information 202, the factory information 204, the micro-grid information 206, the environmental information 208, i.e., check the correlation between the metrology data 504 and the process data 502. Then, a step 706 is performed to judge whether the correlation check is successful. If the result of the step 706 is no, the step 702 is performed continually. If the result of the step 706 is yes, a step 708 is performed to check the $DQI_y$ to judge whether the actual metrology data 504 is normal, i.e., quality control $DQI_y$ is performed on the metrology data 504. If the result of the step 708 is bad, a warning is sent (a step 710). If the result of the step 708 is good, a step 712 is performed to integrate the data into the full-periodic pattern based on full-periodic pattern length T. Next, a step 714 is performed to confirm whether there is a need for manual activation of the model (e.g., seasonal changes, substantial changes in schedules or replacement of old and new factory equipment). If the result of the step 714 is yes, a step 720 is performed. If the result of the step 714 is no, a step 716 is performed. The step 716 includes judging whether the model needs to be tuned or refreshed (e.g., the MAPE does not meet an accuracy threshold). If the result of the step 716 is yes, a step 718 is performed. If the result of the step 716 is no, the step 702 is performed continually. The step 718 includes tuning the DQI model, the RI model 520, the GSI model 530 and the VM model by using the same memorizing length P and the same forecasting length F. The step 720 includes using the period calculator (PC) to find the memorizing length P, the forecasting length F and the full-periodic pattern length T, and re-train the DQI model, the RI model 520, the GSI model 530 and the VM model. Next, a step 722 is performed to update the DQI model, the RI model 520, the GSI model 530 and the VM model. Finally, a step 724 is performed to re-output the phase-two virtual metrology value $VM_{II}$ whose length is the forecasting length F and its corresponding RI and GSI, and the step 702 is performed continually.

Therefore, the automatic virtual metrology algorithm S2 and the automatic virtual metrology system 500 of the present disclosure develop the automatic virtual metrology (AVM) based on the long sequence time-series prediction framework, which can provide accurate predictive future trends to increase decision-making accuracy (such as production scheduling or facility control). The built-in period calculator (PC) is used to automatically find out the best memorizing length P, the best forecasting length F, and the best full-periodic pattern length T for the long sequence time-series prediction framework. The procedure of the advanced dual-phase algorithm 5082 is also enhanced to achieve self-updating with time for AVM based on the long sequence time-series prediction framework.

Figure 10:
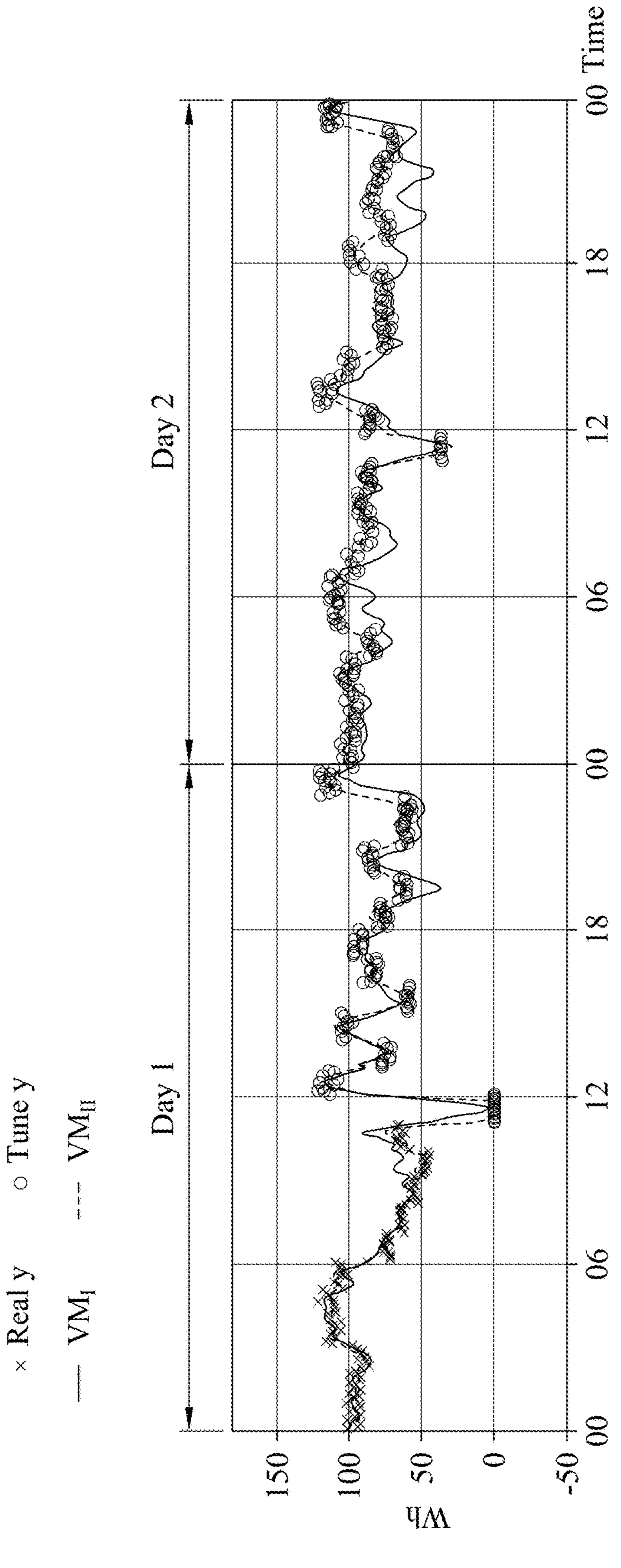
FIG. 10 shows a schematic view of an energy consumption prediction result based on the advanced dual-phase algorithm of FIG. 9.

Referring to FIGS. 9 and 10. FIG. 10 shows a schematic view of an energy consumption prediction result based on the advanced dual-phase algorithm 5082 of FIG. 9. In the embodiment, the energy consumption prediction is performed in one day before a current time point (Day 1) and one day after the current time point (Day 2). The solid curve represents a first model prediction result (i.e., the phase-one virtual metrology value $VM_I$), and the dotted curve represents a second model prediction result (i.e., the phase-two virtual metrology value $VM_{II}$). The symbol "x" represents actual values (i.e., Real y), and the symbol "○" represents updated actual values (i.e., Tune y). It can be seen from FIG. 10 that there is a big difference between the solid curve and the actual values in the one day after the current time point (Day 2), thus resulting in the MAPE as high as 9.757%. However, the present disclosure can update the models (based on the advanced dual-phase algorithm 5082). The updated dotted curve (i.e., the phase-two virtual metrology value $VM_{II}$) is closer to the updated actual values (i.e., Tune y), and the MAPE is also significantly improved to 4.114%.

The cyber physical agents (CPAs) of the present disclosure includes: (1) utilizing vertical integration with the cloud service through communication module, sending information to the cloud server for storage or receiving instructions from the cloud service; (2) utilizing the equipment driver to integrate data with different sources, formats and processing methods horizontally, or transmit instructions to the equipment; (3) having pluggable application module, which can perform functions such as feature extraction and target data extraction; (4) having data collection plan to perform data collection whenever the status meets the conditions; (5) having kernel module to make each module operate smoothly and coordinate the operation of each module in CPA; (6) utilizing containerization technology to have advanced software functions of load balance, failover, health inspection and computing resource allocation; and (7) having general-purpose information security protection mechanism (SPM) framework planning and including digital signatures and hardware key identification, which can ensure that the data uploaded to the cloud manufacturing service are safe and untampered. In another embodiment, the cyber physical agents (CPAs) mentioned above can refer to U.S. Pat. No. 10,618,137 B2. That is, U.S. Pat. No. 10,618,137 B2 is hereby incorporated by reference.

It can be understood that the intelligent energy management method S0 and the automatic virtual metrology algorithm S2 of the present disclosure is the above-mentioned implementation steps, and the computer program product of the present disclosure is used to perform the intelligent energy management method S0 and the automatic virtual metrology algorithm S2. The order of each implementation step described in the above embodiments can be adjusted, combined or omitted as needed. The aforementioned embodiments can be provided as a computer program product, which may include a machine-readable medium on which instructions are stored for programming a computer (or other electronic devices) to perform a process based on the embodiments of the present disclosure. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, or another type of media/machine-readable medium suitable for storing electronic instructions. Moreover, the embodiments of the present disclosure also can be downloaded as a computer program product, which may be transferred from a remote computer to a requesting computer by using data signals via a communication link (such as a network connection or the like).

It is also noted that the present disclosure also can be described in the context of a manufacturing system. The present disclosure may be implemented in various manufacturing industries. The manufacturing system is configured to fabricate workpieces or products including, but not limited to, panel devices, semiconductor devices, LED devices, solar devices, microprocessors, memory devices, digital signal processors, application specific integrated circuits (ASICs), or other similar devices. The present disclosure may also be applied to other workpieces or manufactured products, such as vehicle wheels, screws and papermaking. The manufacturing system includes one or more processing tools that may be used to form one or more products, or portions thereof, in or on the workpieces (such as wafers, glass substrates and paper). Persons of ordinary skill in the art should appreciate that the processing tools may be implemented in any number of entities of any type, including lithography tools, deposition tools, etching tools, polishing tools, annealing tools, machine tools, and the like. In the embodiments, the manufacturing system also includes one or more metrology tools, such as scatterometers, ellipsometers, scanning electron microscopes, and the like.

According to the aforementioned embodiments and examples, the advantages of the present disclosure are described as follows.

1. The intelligent energy management system and the intelligent energy management method of the present disclosure can achieve cost-minimized scheduling and effectively reduce carbon emissions and energy consumption by simultaneously integrating production scheduling, facility control, microgrid integration and carbon emission management. In addition, using the results of production scheduling and facility control as the constraint of the electricity demand can ensure that the electricity supply can meet the electricity demand to stabilize the balance of the power system while taking into account the reduction of energy consumption and carbon emissions, thereby accelerating the realization of the goals of green smart manufacturing and net-zero carbon emissions.

2. The automatic virtual metrology algorithm and the automatic virtual metrology system of the present disclosure develop the automatic virtual metrology (AVM) based on the long sequence time-series prediction framework, which can provide accurate predictive future trends to increase decision-making accuracy. The built-in period calculator is used to automatically find out the best memorizing length, the forecasting length, and the full-periodic pattern length for the long sequence time-series prediction framework. The procedure of the advanced dual-phase algorithm is also enhanced to achieve self-updating with time for AVM based on the long sequence time-series prediction framework.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intelligent energy management system, comprising:

a memory storing a plurality of data sources, wherein the plurality of data sources comprise production line information, factory information, microgrid information, environmental information, a carbon emission, a low-carbon product process, enterprise organization information and carbon neutrality information, the production line information comes from production equipment of a manufacturing device, the factory information comes from factory equipment of the manufacturing device, and the microgrid information comes from microgrid equipment of the manufacturing device; and a processor signally connected to the memory and configured to perform operations comprising:

performing a plurality of energy prediction operations, wherein the plurality of energy prediction operations comprise calculating the data sources to obtain a plurality of energy prediction information according to an automatic virtual metrology algorithm, and the plurality of energy prediction information comprise production-equipment predicted energy consumption information, factory-equipment predicted energy consumption information, renewable-energy-generator predicted power generation information and whole-factory optimal predicted total energy consumption information;

performing a production scheduling operation, wherein the production scheduling operation comprises calculating the production-equipment predicted energy consumption information, the carbon emission, the low-carbon product process and the enterprise organization information to obtain optimal production scheduling information according to a production scheduling algorithm;

performing a facility control operation, wherein the facility control operation comprises calculating the optimal production scheduling information, the factory-equipment predicted energy consumption information, the carbon emission and the enterprise organization information to obtain optimal configuration combination information according to a facility control algorithm; and performing a microgrid integration operation, wherein the microgrid integration operation comprises calculating the whole-factory optimal predicted total energy consumption information, the renewable-energy-generator predicted power generation information and the carbon neutrality information to obtain optimal power distribution ratio information according to a microgrid integration algorithm;

wherein the processor manages energy of the manufacturing device according to the optimal production scheduling information, the optimal configuration combination information and the optimal power distribution ratio information.

2. The intelligent energy management system of claim 1, wherein the microgrid equipment comprises a renewable energy generator, the optimal production scheduling information, the optimal configuration combination information and the optimal power distribution ratio information are configured to control the production equipment, the factory equipment and the renewable energy generator of the microgrid equipment, respectively, to update the production-equipment predicted energy consumption information, the factory-equipment predicted energy consumption information and the renewable-energy-generator predicted power generation information.

3. The intelligent energy management system of claim 1, wherein the production scheduling algorithm comprises:

performing a mixed integer linear programming (MILP) to solve the optimal production scheduling information for a minimum production cost, wherein the minimum production cost is calculated as follows:

$$\min PC = w1_{PC}PC^{wait} + w2_{PC}PC^{pro} + w3_{PC}PC^{ele} + (1 - w1_{PC} - w2_{PC} - w3_{PC})PC^{ce};$$

wherein min PC represents the minimum production cost; $wn_{PC}$ represents a production scheduling weight, and n is one of 1, 2 and 3; $PC^{wait}$ represents a delivery delay cost; $PC^{pro}$ represents a production cost; $PC^{ele}$ represents an electricity cost; and $PC^{ce}$ represents a carbon emission cost.

4. The intelligent energy management system of claim 3, wherein the delivery delay cost is calculated as follows:

$$PC^{wait} = \sum_{j=1}^{J} \max(\max(F_{mj}) - D_j, 0)C_{wait,j};$$

$$B_{mj} \geq F_{mj'} + T_{mjj'} - (1 - S_{mjj'}) \cdot L; \text{ and}$$

$$F_{mj} \geq B_{mj} + P_{mj} - (1 - O_{mj}) \cdot L;$$

wherein $F_{mj}$ represents a completion time of job j on machine m; $D_j$ represents a due date of the job j; $C_{wait,j}$ represents a delay cost of the job j; J represents a number of the job j; $B_{mj}$ represents a starting time of the job j on the machine m; $F_{mj'}$ represents a completion time of job j' on the machine m; $T_{mjj'}$ represents a setup time from the job j' to the job j on the machine m; $S_{mjj'}$ represents a sequence status of the job j and the job j' on the machine m, $S_{mjj'}=1$ if the job j' precedes the job j on the machine m, and $S_{mjj'}=0$ otherwise; L represents a large-value punishment constant; and $P_{mj}$ represents a processing time of the job j on the machine m.

5. The intelligent energy management system of claim 3, wherein, the production cost is calculated as follows:

$$PC^{pro} = \sum_{m=1}^{M} \sum_{j=1,}^{J} O_{mj} \cdot C_{pro,mj}; \text{ and}$$

$$\sum_{m=1}^{M} O_{mj} = 1, \forall j;$$

wherein M represents a number of machine m; $O_{mj}$ represents an execution status of job j on the machine m, $O_{mj}=1$ if the job j is processed on the machine m, and $O_{mj}=0$ otherwise; and $C_{pro,mj}$ represents a production cost of the job j on the machine m;

the electricity cost is calculated as follows:

$$PC^{ele} = \sum_{m=1}^{M} \sum_{j=1}^{J} \sum_{i=B_{mj}}^{F_{mj}} O_{mj} \cdot (EP_{pro})_{j,m,i} \cdot P_i^E;$$

wherein $(EP_{pro})_{j,m,i}$ represents a power consumption of the job j executed on the machine m during period i; and $$P_i^E$$

represents a time-of-use electricity price for the period i; and the carbon emission cost is calculated as follows:

$$PC^{ce} = \sum_{m=1}^{M} \sum_{j=1}^{J} \sum_{i=B_{mj}}^{F_{mj}} \left(CD_{mj} + (EP_{pro})_{j,m,i} \cdot CEC_{ele}\right) \cdot O_{mj} P_i^C;$$

wherein $CD_{mj}$ represents a direct carbon emission of the job j executed on the machine m, which is obtained by a carbon disclosure; $CEC_{ele}$ represents an electricity carbon emission coefficient; and $$P_i^C$$

represents a time-of-use carbon price for the period i.

6. The intelligent energy management system of claim 1, wherein the facility control algorithm comprises:

performing an optimization algorithm to solve the optimal configuration combination information for a minimum factory cost, wherein the minimum factory cost is calculated as follows:

$$\min FC = w_{FC}FC^{ele} + (1 - w_{FC})FC^{ce};$$

wherein min FC represents the minimum factory cost; $w_{FC}$ represents a facility control weight; $FC^{ele}$ represents an electricity cost; and $FC^{ce}$ represents a carbon emission cost.

7. The intelligent energy management system of claim 6, wherein the factory equipment has a load and a facility load demand, and the load and the facility load demand are calculated as follows:

$$0 \leq \sum_{f=1}^{F} \text{Load}_f \leq \sum_{f=1}^{F} \text{Rated Load}_f; \text{ and}$$

$$FLD \leq \sum_{f=1}^{F} \sum_{i=1}^{R} \text{Load}_{f,i};$$

wherein F represents a number of the factory equipment f; R represents a number of period i; $\text{Load}_f$ represents the load of the factory equipment f, Rated $\text{Load}_f$ represents a rated load of the factory equipment f; FLD represents the facility load demand; and $\text{Load}_{f,i}$ represents a cumulative load provided from the factory equipment f during the period i.

8. The intelligent energy management system of claim 6, wherein, the electricity cost of the factory equipment is calculated as follows:

$$FC^{ele}=\sum_{f=1}^{F}\sum_{i=1}^{R}(EP_{fac})_{f,i}\cdot P_i^E;\text{ and}$$

$$\sum_{f=1}^{F}\sum_{\tau=1}^{T}(EP_{fac})_{f,\tau}=\sum_{f=1}^{F}\sum_{i=1}^{R}EP_{fac}(IFP_{fac})_{f,i};$$

wherein F represents a number of the factory equipment f; T represents a number of period τ; R represents a number of period i;

$i;\ P_i^E$ represents a time-of-use electricity price for the period i; $(EP_{fac})_{f,i}$ represents a predicted power consumption of the factory equipment f during the period i; $(EP_{fac})_{f,\tau}$ represents a predicted power consumption of the factory equipment f during the period τ; $IFP_{fac}$ represents a facility parameter; and $EP_{fac}$ represents a factory-equipment energy prediction model; and the carbon emission cost of the factory equipment is calculated as follows:

$$FC^{ce}=\sum_{f=1}^{F}\sum_{i=1}^{R}\left(CD_f+(EP_{fac})_{f,i}\cdot CEC_{ele}\right)\cdot P_i^C;$$

wherein $CD_f$ represents another carbon emission from a fugitive emission source, which is obtained by a carbon disclosure; $CEC_{ele}$ represents an electricity carbon emission coefficient; and $P_i^C$ represents a time-of-use carbon price for the period i.

9. The intelligent energy management system of claim 1, wherein, the microgrid integration algorithm comprises:

performing an optimization algorithm to solve the optimal power distribution ratio information for a minimum microgrid cost, wherein the minimum microgrid cost is calculated as follows:

$$\min MC=w1_{MC}MC^C+w2_{MC}MC^O+w3_{MC}MC^{UG}+w4_{MC}MC^F+(1-w1_{MC}-w2_{MC}-w3_{MC}-w4_{MC})MC^E;$$

wherein min MC represents the minimum microgrid cost; $wn_{MC}$ represents a power distribution weight, and n is one of 1, 2, 3 and 4; $MC^C$ represents a carbon emission cost; $MC^O$ represents an equipment operation cost; $MC^{UG}$ represents an electricity cost; $MC^F$ represents a fuel cost; and $MC^E$ represents a charge-discharge efficiency cost; and the whole-factory optimal predicted total energy consumption information is calculated as follows:

$$\widehat{EC}_{all}(T_{k+1})=\widehat{EC}_{pro}(T_{k+1})+\widehat{EC}_{fac}(T_{k+1});$$

wherein $\widehat{EC}_{all}(T_{k+1})$ represents the whole-factory optimal predicted total energy consumption information; $\widehat{EC}_{pro}(T_{k+1})$ represents an estimated energy consumption corresponding to the optimal production scheduling information of the production equipment; and $\widehat{EC}_{fac}(T_{k+1})$ represents another estimated energy consumption corresponding to the optimal configuration combination information of the factory equipment.

10. The intelligent energy management system of claim 1, wherein the processor is configured to perform the operations further comprising:

performing a carbon disclosure operation, wherein the carbon disclosure operation comprises obtaining an inventory data by performing carbon inventory on the manufacturing device, and then providing the inventory data to a plurality of cyber physical agents, and generating product raw material information corresponding to a product, and the inventory data comprises the carbon emission;

performing a carbon reduction operation, wherein the carbon reduction operation comprises improving the low-carbon product process of the product based on the product raw material information so as to reduce the carbon emission; and performing a carbon neutrality operation, wherein the carbon neutrality operation comprises realizing a net zero principle according to a low-carbon energy allocation method when the carbon emission no longer be reduced through the low-carbon product process at a present stage, and the low-carbon energy allocation method comprises a carbon credit or a carbon offset.

11. An intelligent energy management method, comprising:

performing an information obtaining step, comprising configuring a memory to obtain a plurality of data sources, the plurality of data sources comprise production line information, factory information, microgrid information, environmental information, a carbon emission, a low-carbon product process, enterprise organization information and carbon neutrality information, the production line information comes from production equipment of a manufacturing device, the factory information comes from factory equipment of the manufacturing device, and the microgrid information comes from microgrid equipment of the manufacturing device; and performing an intelligent energy management step, comprising:

performing a plurality of energy prediction steps, wherein the plurality of energy prediction steps comprise configuring a processor to calculate the data sources to obtain a plurality of energy prediction information according to an automatic virtual metrology algorithm, and the plurality of energy prediction information comprise production-equipment predicted energy consumption information, factory-equipment predicted energy consumption information, renewable-energy-generator predicted power generation information and whole-factory optimal predicted total energy consumption information;

performing a production scheduling step, wherein the production scheduling step comprises configuring the processor to calculate the production-equipment predicted energy consumption information, the carbon emission, the low-carbon product process and the enterprise organization information to obtain optimal production scheduling information according to a production scheduling algorithm;

performing a facility control step, wherein the facility control step comprises configuring the processor to calculate the optimal production scheduling information, the factory-equipment predicted energy consumption information, the carbon emission and the enterprise organization information to obtain optimal configuration combination information according to a facility control algorithm; and performing a microgrid integration step, wherein the microgrid integration step comprises configuring the processor to calculate the whole-factory optimal predicted total energy consumption information, the renewable-energy-generator predicted power generation information and the carbon neutrality information to obtain optimal power distribution ratio information according to a microgrid integration algorithm;

wherein the processor manages energy of the manufacturing device according to the optimal production scheduling information, the optimal configuration combination information and the optimal power distribution ratio information.

12. The intelligent energy management method of claim 11, wherein the microgrid equipment comprises a renewable energy generator, the optimal production scheduling information, the optimal configuration combination information and the optimal power distribution ratio information are configured to control the production equipment, the factory equipment and the renewable energy generator of the microgrid equipment, respectively, to update the production-equipment predicted energy consumption information, the factory-equipment predicted energy consumption information and the renewable-energy-generator predicted power generation information.

13. The intelligent energy management method of claim 11, wherein the production scheduling algorithm comprises:

performing a mixed integer linear programming (MILP) to solve the optimal production scheduling information for a minimum production cost, wherein the minimum production cost is calculated as follows:

$$\min PC = w1_{PC}PC^{wait} + w2_{PC}PC^{pro} + w3_{PC}PC^{ele} + (1 - w1_{PC} - w2_{PC} - w3_{PC})PC^{ce};$$

wherein min PC represents the minimum production cost; $wn_{PC}$ represents a production scheduling weight, and n is one of 1, 2 and 3; $PC^{wait}$ represents a delivery delay cost; $PC^{pro}$ represents a production cost; $PC^{ele}$ represents an electricity cost; and $PC^{ce}$ represents a carbon emission cost.

14. The intelligent energy management method of claim 13, wherein the delivery delay cost is calculated as follows:

$$PC^{wait} = \sum_{j=1}^{J} \max(\max(F_{mj}) - D_j, 0)C_{wait,j};$$

$$B_{mj} \geq F_{mj'} + T_{mjj'} - (1 - S_{mjj'}) \cdot L; \text{ and}$$

$$F_{mj} \geq B_{mj} + P_{mj} - (1 - O_{mj}) \cdot L;$$

wherein $F_{mj}$ represents a completion time of job j on machine m; $D_j$ represents a due date of the job j; $C_{wait,j}$ represents a delay cost of the job j; J represents a number of the job j; $B_{mj}$ represents a starting time of the job j on the machine m; $F_{mj'}$ represents a completion time of job j' on the machine m; $T_{mjj'}$ represents a setup time from the job j' to the job j on the machine m; $S_{mjj'}$ represents a sequence status of the job j and the job j' on the machine m, $S_{mjj'}=1$ if the job j' precedes the job j on the machine m, and $S_{mij'}=0$ otherwise; L represents a large-value punishment constant; and $P_{mj}$ represents a processing time of the job j on the machine m.

15. The intelligent energy management method of claim 13, wherein, the production cost is calculated as follows:

$$PC^{pro} = \sum_{m=1}^{M} \sum_{j=1}^{J} O_{mj} \cdot C_{pro,mj}; \text{ and}$$

$$\sum_{m=1}^{M} O_{mj} = 1, \forall j;$$

wherein M represents a number of machine m; $O_{mj}$ represents an execution status of job j on the machine m, $O_{mj}=1$ if the job j is processed on the machine m, and $O_{mj}=0$ otherwise; and $C_{pro,mj}$ represents a production cost of the job j on the machine m;

the electricity cost is calculated as follows:

$$PC^{ele} = \sum_{m=1}^{M} \sum_{j=1}^{J} \sum_{i=B_{mj}}^{F_{mj}} O_{mj} \cdot (EP_{pro})_{j,m,i} \cdot P_i^E;$$

wherein $(EP_{pro})_{j,m,i}$ represents a power consumption of the job j executed on the machine m during period i; and $$P_i^E$$

represents a time-of-use electricity price for the period i; and the carbon emission cost is calculated as follows:

$$PC^{ce} = \sum_{m=1}^{M} \sum_{j=1}^{J} \sum_{i=B_{mj}}^{F_{mj}} (CD_{mj} + (EP_{pro})_{j,m,i} \cdot CEC_{ele}) \cdot O_{mj} P_i^C;$$

wherein $CD_{mj}$ represents a direct carbon emission of the job j executed on the machine m, which is obtained by a carbon disclosure; $CEC_{ele}$ represents an electricity carbon emission coefficient; and $$P_i^C$$

represents a time-of-use carbon price for the period i.

16. The intelligent energy management method of claim 11, wherein the facility control algorithm comprises:

performing an optimization algorithm to solve the optimal configuration combination information for a minimum factory cost, wherein the minimum factory cost is calculated as follows:

$$\min FC = w_{FC} FC^{ele} + (1 - w_{FC}) FC^{ce};$$

wherein min FC represents the minimum factory cost; $w_{FC}$ represents a facility control weight; $FC^{ele}$ represents an electricity cost; and $FC^{ce}$ represents a carbon emission cost.

17. The intelligent energy management method of claim 16, wherein the factory equipment has a load and a facility load demand, and the load and the facility load demand are calculated as follows:

$$0 \le \sum_{f=1}^{F} \text{Load}_f \le \sum_{f=1}^{F} \text{Rated Load}_f; \text{ and}$$

$$FLD \le \sum_{f=1}^{F} \sum_{i=1}^{R} \text{Load}_{f,i};$$

wherein F represents a number of the factory equipment f; R represents a number of period i; $\text{Load}_f$ represents the load of the factory equipment f, Rated $\text{Load}_f$ represents a rated load of the factory equipment f, FLD represents the facility load demand; and $\text{Load}_{f,i}$ represents a cumulative load provided from the factory equipment f during the period i.

18. The intelligent energy management method of claim 16, wherein, the electricity cost of the factory equipment is calculated as follows:

$$FC^{ele} = \sum_{f=1}^{F} \sum_{i=1}^{R} (EP_{fac})_{f,i} \cdot P_i^E; \text{ and}$$

$$\sum_{f=1}^{F} \sum_{\tau=1}^{T} (EP_{fac})_{f,\tau} = \sum_{f=1}^{F} \sum_{i=1}^{R} EP_{fac}(IFP_{fac})_{f,i};$$

wherein F represents a number of the factory equipment f, T represents a number of period τ; R represents a number of period $$i; P_i^E$$

represents a time-of-use electricity price for the period i; $(EP_{fac})_{f,i}$ represents a predicted power consumption of the factory equipment f during the period i; $(EP_{fac})_{f,\tau}$ represents a predicted power consumption of the factory equipment f during the period τ; $IFP_{fac}$ represents a facility parameter; and $EP_{fac}$ represents a factory-equipment energy prediction model; and the carbon emission cost of the factory equipment is calculated as follows:

$$FC^{ce} = \sum_{f=1}^{F} \sum_{i=1}^{R} \left( CD_f + (EP_{fac})_{f,i} \cdot CEC_{ele} \right) \cdot P_i^C;$$

wherein $CD_f$ represents another carbon emission from a fugitive emission source, which is obtained by a carbon disclosure; $CEC_{ele}$ represents an electricity carbon emission coefficient; and $$P_i^C$$

represents a time-of-use carbon price for the period i.

19. The intelligent energy management method of claim 11, wherein, the microgrid integration algorithm comprises:

performing an optimization algorithm to solve the optimal power distribution ratio information for a minimum microgrid cost, wherein the minimum microgrid cost is calculated as follows:

$$\min MC = w1_{MC} MC^C + w2_{MC} MC^O + w3_{MC} MC^{UG} + w4_{MC} MC^F + (1 - w1_{MC} - w2_{MC} - w3_{MC} - w4_{MC}) MC^E;$$

wherein min MC represents the minimum microgrid cost; $wn_{MC}$ represents a power distribution weight, and n is one of 1, 2, 3 and 4; $MC^C$ represents a carbon emission cost; $MC^O$ represents an equipment operation cost; $MC^{UG}$ represents an electricity cost; $MC^F$ represents a fuel cost; and $MC^E$ represents a charge-discharge efficiency cost; and the whole-factory optimal predicted total energy consumption information is calculated as follows:

$$\widehat{EC}_{all}(T_{k+1}) = \widehat{EC}_{pro}(T_{k+1}) + \widehat{EC}_{fac}(T_{k+1});$$

wherein $\widehat{EC}_{all}(T_{k+1})$ represents the whole-factory optimal predicted total energy consumption information; $\widehat{EC}_{pro}(T_{k+1})$ represents an estimated energy consumption corresponding to the optimal production scheduling information of the production equipment; and $\widehat{EC}_{fac}(T_{k+1})$ represents another estimated energy consumption corresponding to the optimal configuration combination information of the factory equipment.

20. The intelligent energy management method of claim 11, further comprising:

performing an intelligent carbon management step, comprising:

performing a carbon disclosure step, wherein the carbon disclosure step comprises configuring the processor to obtain an inventory data by performing carbon inventory on the manufacturing device, and then provide the inventory data to a plurality of cyber physical agents, and generate product raw material information corresponding to a product, and the inventory data comprises the carbon emission;

performing a carbon reduction step, wherein the carbon reduction step comprises configuring the processor to improve the low-carbon product process of the product based on the product raw material information so as to reduce the carbon emission; and performing a carbon neutrality step, wherein the carbon neutrality step comprises configuring the processor to realize a net zero principle according to a low-carbon energy allocation method when the carbon emission no longer be reduced through the low-carbon product process at a present stage, and the low-carbon energy allocation method comprises a carbon credit or a carbon offset.

* * * * *